United States Patent
Zhang et al.

(10) Patent No.: US 12,214,740 B2
(45) Date of Patent: Feb. 4, 2025

(54) TETHER ANCHOR ASSEMBLY FOR CURTAIN AIRBAG

(71) Applicant: ZF Passive Safety Systems US Inc., Washington, MI (US)

(72) Inventors: Songwei Zhang, Troy, MI (US); Daniel R. Sutherland, Richmond Township, MI (US); Dylan Moran, Rochester Hills, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/860,566

(22) Filed: Jul. 8, 2022

(65) Prior Publication Data

US 2024/0010158 A1 Jan. 11, 2024

(51) Int. Cl.
*B60R 21/2338* (2011.01)
*B60R 21/213* (2011.01)
*B60R 21/231* (2011.01)
*B60R 21/232* (2011.01)

(52) U.S. Cl.
CPC ........ *B60R 21/2338* (2013.01); *B60R 21/213* (2013.01); *B60R 21/23138* (2013.01); *B60R 21/232* (2013.01); *B60R 2021/23388* (2013.01)

(58) Field of Classification Search
CPC .......... B60R 21/2338; B60R 21/23138; B60R 2021/23388; B60R 21/232; B60R 21/213
See application file for complete search history.

(56) References Cited

U.S. PATENT DOCUMENTS

| | | | | |
|---|---|---|---|---|
| 5,588,672 A | * | 12/1996 | Karlow | B60R 21/232 |
| | | | | 280/730.2 |
| 5,660,414 A | * | 8/1997 | Karlow | B60R 21/08 |
| | | | | 180/274 |
| 6,237,938 B1 | | 5/2001 | Boxey | |

(Continued)

*Primary Examiner* — Jason D Shanske
*Assistant Examiner* — Joselynn Y Sliteris
(74) *Attorney, Agent, or Firm* — Tarolli, Sundheim, Covell & Tummino LLP

(57) ABSTRACT

An anchor assembly for connecting a curtain airbag to a side structure of a vehicle includes an elongated track configured to be connected to the side structure of the vehicle behind a vehicle trim piece that covers the side structure and forms a surface visible from within a passenger compartment of the vehicle. An anchor is configured to move along the track. The track includes sidewalls that define an interior channel that extends along the length of the track, and a slot that extends along the length of the track. The anchor includes a shank and a roller that is connected to the shank and rotatable relative to the shank. The roller and a portion of the shank to which the roller is connected are positioned in the channel and are movable along the channel when the anchor moves along the track. A portion of the shank extends through the slot, is positioned on an exterior of the track, and is configured to be connected to the curtain airbag. The track is configured so that the slot is at least partially exposed to a gap between trim piece and the side structure so that the portion of the shank that extends through the slot is not inhibited by the trim piece from moving along the slot when the anchor moves along the track in response to curtain airbag deployment.

20 Claims, 14 Drawing Sheets

(56) References Cited

U.S. PATENT DOCUMENTS

| | | | | |
|---|---|---|---|---|
| 6,237,943 B1* | 5/2001 | Brown | ............... | B60R 21/232 |
| | | | | 280/730.2 |
| 6,435,545 B1* | 8/2002 | Osentoski | ............ | B60R 21/232 |
| | | | | 280/730.2 |
| 6,474,678 B1* | 11/2002 | Boxey | ............... | B60R 21/2338 |
| | | | | 280/730.2 |
| 6,733,035 B2* | 5/2004 | Thomas | ............ | B60R 21/232 |
| | | | | 280/730.2 |
| 6,902,188 B2* | 6/2005 | Nakamura | ............ | B60R 21/213 |
| | | | | 280/730.2 |
| 7,219,921 B2* | 5/2007 | Noguchi | ............ | B60R 21/2338 |
| | | | | 280/730.2 |
| 7,946,615 B2* | 5/2011 | Takahashi | ............ | B60J 1/2011 |
| | | | | 280/730.2 |
| 8,235,418 B2* | 8/2012 | Slaats | ............... | B60R 21/232 |
| | | | | 280/730.2 |
| 8,967,661 B2* | 3/2015 | Mueller | ............... | B60R 21/214 |
| | | | | 280/730.2 |
| 9,333,934 B2* | 5/2016 | Sitko | ............... | B60R 21/213 |
| 11,590,921 B1* | 2/2023 | Farooq | ............... | A61G 3/0808 |

\* cited by examiner

TETHER ANCHOR ASSEMBLY FOR CURTAIN AIRBAG

TECHNICAL FIELD

The present invention relates generally to a curtain airbag for helping to protect an occupant of a vehicle. More particularly, the present invention relates to a tether anchor assembly for connecting a curtain airbag to a vehicle.

BACKGROUND OF THE INVENTION

Curtain airbags are configured to help protect vehicle occupants in the event of side impact and rollover crash events. Curtain airbags are typically rolled-up or folded-up about a roll/fold axis to form an elongated airbag package that is installed in a vehicle via mounting tabs spaced along its length. Curtain airbags are typically installed along a roof rail of the vehicle and, when inflated, deploy downward, unrolling and/or unfolding to a deployed position between the occupant and a side structure of the vehicle.

Curtain airbags serve dual purposes: one of impact protection and one of occupant restraint. For impact protection, the curtain airbag serves as a cushion positioned between the occupant and the side structure of the vehicle. For occupant restraint, the curtain airbag helps prevent the occupant from being ejected from or otherwise passing through a window opening. To achieve these purposes, it is desirable that the curtain airbag deploys quickly and without restriction.

SUMMARY

A tether anchor assembly for a curtain airbag connects a lower portion of the curtain airbag to the vehicle side structure behind a vehicle trim piece that covers the side structure and forms a surface visible from within a passenger compartment of the vehicle. The tether anchor assembly connects the curtain airbag to the vehicle side structure and helps limit outboard movement of the airbag relative to the side structure. The anchor assembly includes an elongated channel and an anchor that is configured to be received in and move along the channel. The anchor is further configured for connection to a tether connected to a lower end portion of the curtain airbag.

In response to inflation and deployment of the curtain airbag, the anchor moves along the channel in the deployment direction, pulled by the airbag via the tether. The track is configured so that the slot is at least partially exposed to a gap between trim piece and the side structure so that the portion of the shank that extends through the slot is not substantially inhibited by the trim piece from moving along the slot when the anchor moves along the track in response to curtain airbag deployment. The gap allows the anchor/shank to pass through as it moves during curtain airbag deployment so that displacement of the trim piece is not necessary.

According to one aspect of the invention, an anchor assembly for connecting a curtain airbag to a side structure of a vehicle includes an elongated track configured to be connected to the side structure of the vehicle behind a vehicle trim piece that covers the side structure and forms a surface visible from within a passenger compartment of the vehicle. An anchor is configured to move along the track. The track includes sidewalls that define an interior channel that extends along the length of the track, and a slot that extends along the length of the track. The anchor includes a shank and a roller that is connected to the shank and rotatable relative to the shank. The roller and a portion of the shank to which the roller is connected are positioned in the channel and are movable along the channel when the anchor moves along the track. A portion of the shank extends through the slot, is positioned on an exterior of the track, and is configured to be connected to the curtain airbag. The track is configured so that the slot is at least partially exposed to a gap between trim piece and the side structure so that the portion of the shank that extends through the slot is not inhibited by the trim piece from moving along the slot when the anchor moves along the track in response to curtain airbag deployment.

According to another aspect, alone or in combination with any other aspect, the track and anchor can be configured to permit the anchor to pivot relative to the track in response to engagement with the trim pieces and/or the vehicle structure so that the anchor can react to interferences with the trim pieces and/or the vehicle structure during a collision that would otherwise inhibit movement of the anchor along the track.

According to another aspect, alone or in combination with any other aspect, the sidewalls can be configured to define roller receiving portions of the track on opposite lateral sides of the slot. The contours of the roller receiving portions can be configured to follow the contours of the roller portions positioned on opposite sides of the shank. The roller portions and roller receiving portions of the track can be configured to produce a clearance between the roller portions and the roller receiving portions. The clearance can be configured to permit the anchor to pivot relative to the track.

According to another aspect, alone or in combination with any other aspect, the roller receiving portions can include angled surfaces configured to engage corresponding angled surfaces of the roller portions when the anchor pivots relative to the track. The track and the anchor can be configured so that the angled surfaces of the roller receiving portions and the angled surfaces of the roller portions engage substantially flat against each other when the anchor is pivoted relative to the track.

According to another aspect, alone or in combination with any other aspect, the anchor can be configured to pivot a predetermined pivot angle relative to the track. and the angled surfaces of the of the roller portions and the roller receiving portions can be configured to differ by an angle equal to the pivot angle.

According to another aspect, alone or in combination with any other aspect, the angled surfaces of the of the roller portions can be frusto-conical surfaces of the roller portions. The angled surfaces of the roller receiving portions can be flat surfaces tapered to mate or substantially mate with the frusto-conical surfaces.

According to another aspect, alone or in combination with any other aspect, the roller portions can include an outer cylindrical portion having a first diameter and an inner cylindrical portion having a second diameter, less than the first diameter. The angled surfaces of the of the roller portions can include frusto-conical surfaces extending between the outer and inner cylindrical portions. The angled surfaces of the roller receiving portions can be flat surfaces tapered to mate or substantially mate with the frusto-conical surfaces.

According to another aspect, alone or in combination with any other aspect, the pivot can also be configured to cause the anchor to engage the track and inhibit upward movement of the anchor along the track.

According to another aspect, alone or in combination with any other aspect, the track and the anchor can be configured to be concealed behind a vehicle trim piece when installed in a vehicle. The anchor assembly can be configured so that the portion of the shank configured to be connected to the curtain airbag extends from behind the trim piece when moving along the track in response to inflation and deployment of the curtain airbag.

According to another aspect, alone or in combination with any other aspect, the pivot of the anchor relative to the track can be configured to permit the shank to clear the trim piece when moving along the track in response to inflation and deployment of the curtain airbag.

According to another aspect, alone or in combination with any other aspect, the trim piece can cooperate with weatherstripping to conceal the anchor assembly prior to curtain airbag deployment. The shank can be configured to deflect the anchor relative to the track is configured to permit the shank to clear the trim piece when moving along the track in response to inflation and deployment of the curtain airbag.

According to another aspect, alone or in combination with any other aspect, the anchor assembly can also include a pivoting structure configured to cover a gap at least partially defined by the trim piece. The pivoting structure can cover the track and be configured to pivot and reveal the track in response to the anchor moving along the track.

According to another aspect, alone or in combination with any other aspect, the pivoting structure can be configured to extend from the trim piece to weatherstripping that forms a seal with a vehicle door or window opening.

According to another aspect, alone or in combination with any other aspect, the anchor assembly can also include a deflectable structure configured to cover a gap at least partially defined by the trim piece. The deflectable structure can cover the track and be configured to deflect and reveal the track in response to the anchor moving along the track.

According to another aspect, alone or in combination with any other aspect, the deflectable structure can include a portion that forms weatherstripping which forms a seal with a vehicle door or window opening.

According to another aspect, alone or in combination with any other aspect, the trim piece can be configured to cooperate with weatherstripping to conceal the track. The track can be configured to be mounted obliquely outward at an angle so that the shank is directed toward the weatherstripping. The shank can be configured to deflect the weatherstripping and reveal the track in response to the anchor moving along the track.

According to another aspect, alone or in combination with any other aspect, the anchor can be configured to pivot in response to curtain airbag deployment so that the shank clears the trim piece and moves along a gap between the trim piece and adjacent vehicle structure in response to deployment of the curtain airbag.

According to another aspect, alone or in combination with any other aspect, the shank can be configured to engage vehicle structure during curtain airbag deployment. The engagement can urge the shank and the anchor to pivot so that the shank clears the trim piece and moves along the gap in response to deployment of the curtain airbag.

According to another aspect, alone or in combination with any other aspect, the track can be configured to pivot in response to curtain airbag deployment so that the shank clears the trim piece and moves along a gap between the trim piece and adjacent vehicle structure in response to deployment of the curtain airbag.

According to another aspect, alone or in combination with any other aspect, the shank can be configured to engage vehicle structure during curtain airbag deployment. The engagement can urge the anchor to pivot, which causes the track to pivot, so that the shank clears the trim piece and moves along the gap in response to deployment of the curtain airbag.

According to another aspect, alone or in combination with any other aspect, the anchor assembly can also include a mounting assembly configured to connect the track to the vehicle and permit the track to pivot relative to the vehicle.

According to another aspect, a vehicle safety system can include a curtain airbag module including a curtain airbag and an inflator for inflating the curtain airbag. The vehicle safety system can also include the anchor assembly and a tether for connecting the anchor assembly to the curtain airbag.

According an aspect of the vehicle safety system, alone or in combination with any other aspect of the vehicle safety system, the anchor assembly can be configured to be connected to a vehicle pillar adjacent a side window opening and the curtain airbag module can be configured to be connected to the vehicle along a roof rail extending above the side window opening. The tether can be configured to connect a lower edge portion of the curtain airbag to the anchor.

According to another aspect of the vehicle safety system, alone or in combination with any other aspect of the vehicle safety system, the curtain airbag can be configured to inflate and deploy downward to at least partially cover the side window opening. The anchor can be configured to move downward along the track and along the pillar in response to being pulled along by the deploying curtain airbag. The anchor can be configured to pivot relative to the track in response to an occupant engaging the curtain airbag and urging it outboard toward the side window opening. The engagement of the surfaces of the anchor and track in response to the anchor pivoting can cause the anchor to resist upward movement along the track.

DETAILED DESCRIPTION

Vehicle Safety System

Figure 1:
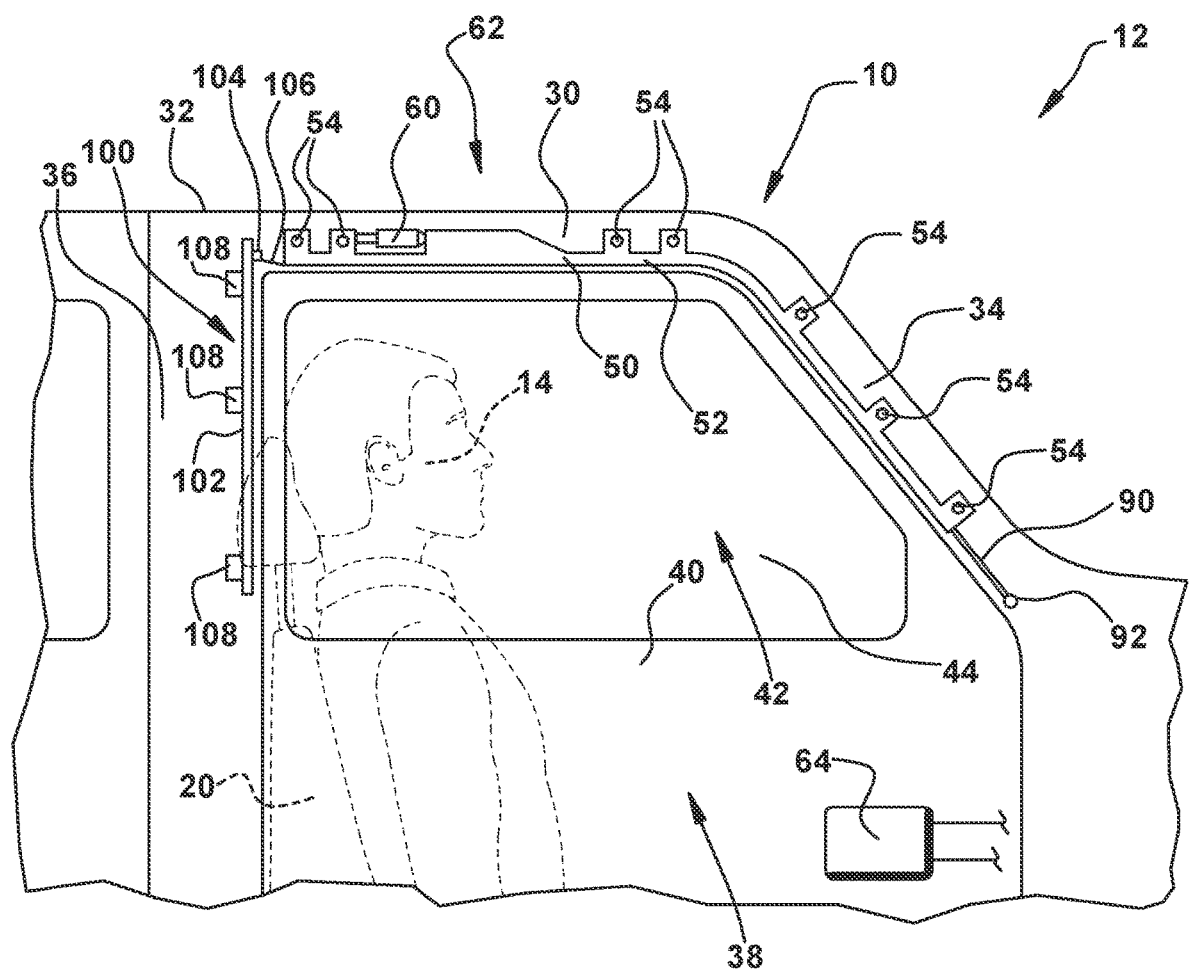
FIG. 1 is a schematic view of a vehicle including a vehicle safety system according to an example configuration of the invention.
Figure 2:
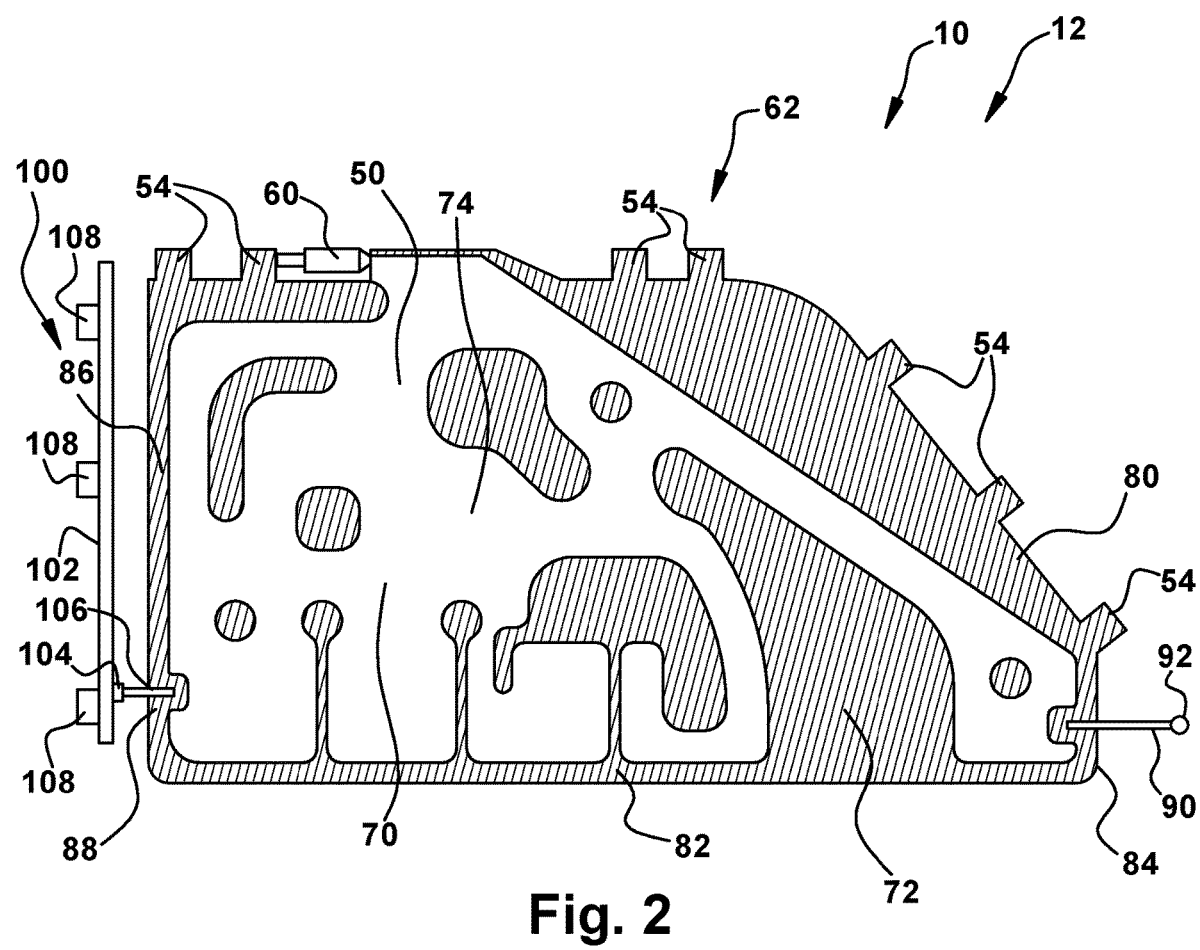
FIG. 2 is a side view of the vehicle illustrating a curtain airbag portion of the vehicle safety system in an inflated and deployed condition.

FIGS. 1 and 2 illustrate a vehicle safety system 10 for helping to protect an occupant 14 of a vehicle 12. The vehicle safety system 10 includes an inflatable vehicle occupant protection device in the form of a curtain airbag 50. The curtain airbag 50 has a stored condition, illustrated in FIG. 1, in which the airbag is deflated, rolled-up and/or folded-up, and packaged for installation in the vehicle 12. In the stored condition of the example curtain airbag 50 illustrated in FIG. 1, the airbag is secured to a vehicle roof rail 30 and extends along the roof 32. The curtain airbag 50 can also be secured to, and extend along, an A-pillar 34 of the vehicle 12.

To maintain the packaging of the curtain airbag 50, i.e., to maintain the curtain airbag in the rolled and/or folded configuration for installation, the airbag can be supported or at least partially enveloped by an airbag wrap 52. The airbag wrap 52 can, for example, be a sheath or sleeve that wraps around the rolled/folded curtain airbag 50 along a portion of its length. Alternatively, the airbag wrap 52 can be a series of loops, such as tape, that wrap around the rolled/folded airbag 50 at spaced locations along its length. The curtain airbag 50 can also include one or more mounting tabs 54 spaced along its length. The mounting tabs 54 can facilitate the use of fasteners, such as screws or other threaded fasteners, alone or aided by clips, for securing the airbag to the roof rail 30.

In the example configuration of FIGS. 1 and 2, the curtain airbag 50 extends along the roof rail 30 from the A-pillar 34 to a B-pillar 36, thereby helping to protect the occupant 14 of a first row seat 20. The curtain airbag 50 could, however, have a different extent. For example, the curtain airbag 50 could extend from the A-pillar 34 to a C-pillar (not shown) and thereby help protect occupants of first and second row seats.

The vehicle safety system 10 also includes an inflator 60 that is actuatable to provide inflation fluid for inflating the curtain airbag 50. The inflator 60 can be assembled with the packaged curtain airbag 50, forming an airbag module 62 configured for installation in the vehicle 12 as a whole. The safety system 10 further includes an airbag controller 64 that is configured to actuate the inflator 60 in response to a sensed crash event, such as a side impact or rollover, for which occupant protection is desired.

Upon sensing a crash event, the airbag controller 64 provides electrical signal(s) over lead wires to the inflator 60, which causes the inflator to be actuated in a known manner and discharge fluid under pressure into the inflatable volume of the curtain airbag 50. The curtain airbag 50 inflates under the pressure of the inflation fluid from the inflator 60 away from the roof 32 to a position between a side structure 38 of the vehicle 12 and any occupants 14 of adjacent seats. The curtain airbag 50, when inflated, helps protect the vehicle occupant(s) by absorbing the energy of impacts with the airbag and helping to distribute the impact energy over a large area of the airbag.

The curtain airbag 50 includes overlying panels 70 that are interconnected at seams 72 (cross hatched portions in FIG. 2) to define inflatable chambers 74. The chambers 74 define an inflatable volume of the curtain airbag 50. The curtain airbag 50 can have a variety of constructions. In one example configuration, the curtain airbag 50 can have a one-piece woven (OPW) construction in which the panels 70 are woven simultaneously, with the seams 72 being portions of the OPW airbag that are woven together as a single layer. Alternatively, the curtain airbag 50 can have a construction in which the panels 70 are separately woven sheets positioned overlying each other and interconnected, for example, via stitching or ultrasonic welding, to form the seams 72 and chambers 74.

The airbag module 62, particularly the curtain airbag 50, is configured so that a forward or front edge portion 80 of the airbag extends along the A-pillar 34 and is connected to the A-pillar via the mounting tabs 54. The front edge portion 80 intersects a lower edge portion 82 of the curtain airbag 50 at a front lower corner 84. As shown in FIGS. 1 and 2, an anchoring tether 90 has a first end connected to the front lower corner 84 curtain airbag and an opposite second end fixed to the A-pillar at an anchoring point 92.

A rearward or rear edge portion 86 of the airbag extends along the B-pillar 36 intersects the lower edge portion 82 of the curtain airbag 50 at a rear lower corner 88. The rear lower corner 88 of the curtain airbag 50 is connected to the B-pillar via an anchor assembly 100. The anchor assembly 100 includes a track 102 connected to the B-pillar 36 and an anchor 104 that is connected to and movable along the track 102. The curtain airbag 50 is connected to the anchor assembly 100 by an anchoring tether 106, which has a first end connected to the rear lower corner 88 of the airbag and an opposite second end connected to the anchor 104. Although the track 102 is illustrated as having a straight, linear configuration, it could be shaped alternatively, such as curved, for example, to follow the contour of the vehicle architecture, to fith within the space available in the vehicle, or to help control its function in supporting the curtain airbag 50.

When the curtain airbag 50 is inflated and deployed (see FIG. 2), it extends along the side structure 38 and covers portions of the side structure, such as the A-pillar 34, B-pillar 36, side door 40 and side window opening 42. The lower edge portion 82 of the airbag is connected at the front lower corner 84 by the anchoring tether 90 connected to the A-pillar, and at the rear lower corner 88 by the anchoring tether 106. These connections support the curtain airbag 50 along the lower edge portion 82. As such, the curtain airbag 50 is anchored along its lower edge portion 82, which supports the curtain against the impacting occupant 14, restraining the occupant against being ejected or otherwise passing through the window opening 42 or impacting a window 44 covering the window opening.

Because the front lower corner 92 extends along the A-pillar 34 in the stored condition of FIG. 1, it is positioned close to its deployed position of FIG. 2. Because of this, the anchor tether 92 can be fixedly connected to the A-pillar 34 at the anchor point 92 upon installation, when the curtain airbag 50 is in the packaged condition in the airbag module 62. The rear lower corner 88, however, is positioned along the roof rail 30 in the stored condition of FIG. 1. Accordingly, an anchor point that is movable along with the inflating and deploying curtain airbag 50 is required for the anchoring tether 106.

The track 102 can be connected to the B-pillar 36 by fasting structures, such as mounting tabs 108 spaces along its length. Alternative fastening structures, such as brackets, can also be used to connect the track 102 to the B-pillar 36. As a further alternative, the track 102 can include fastener openings that extend through its structure and that are configured to receive fasteners for connecting is to the vehicle 12.

First Example Configuration

Figure 3:
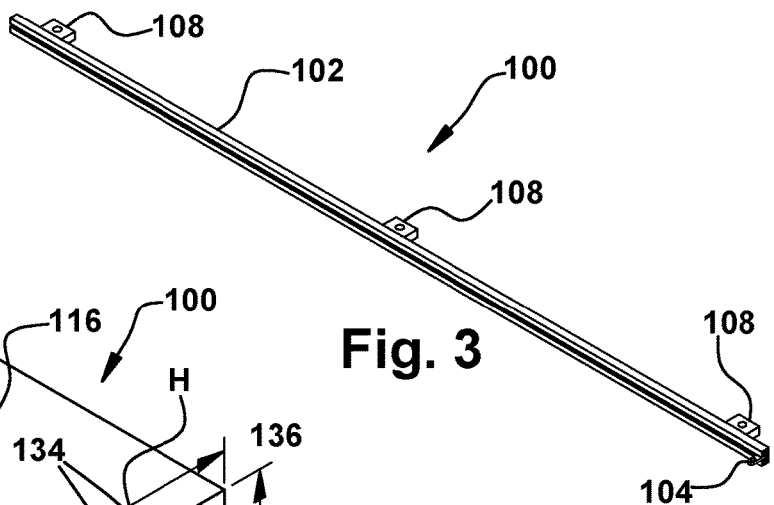
FIG. 3 is a perspective view illustrating an anchor assembly of the vehicle safety system.
Figure 4:
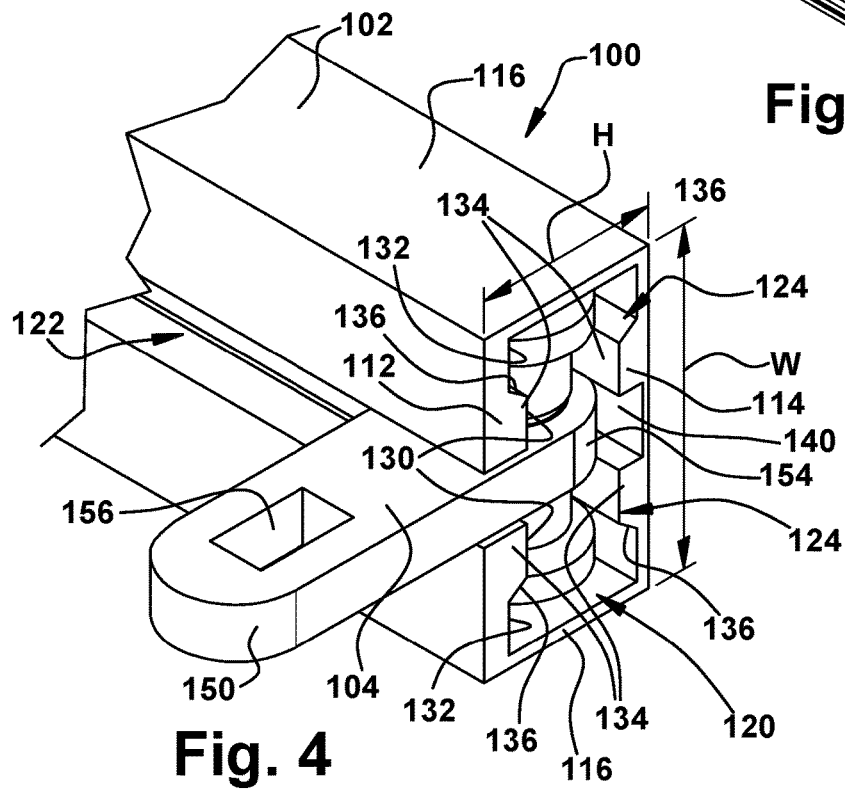
FIG. 4 is a magnified perspective view illustrating a portion of the anchor assembly.
Figure 5:
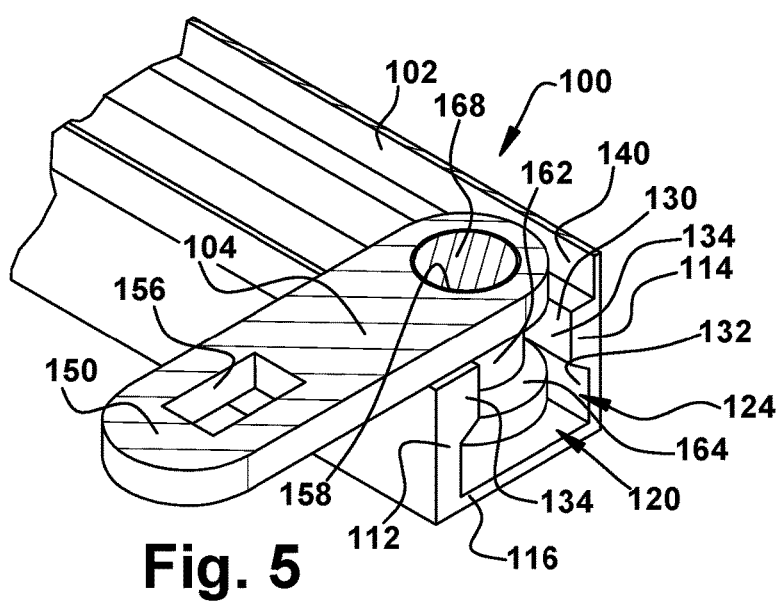
FIG. 5 is a sectional view of the portion of the anchor assembly illustrated in FIG. 4.
Figure 6:
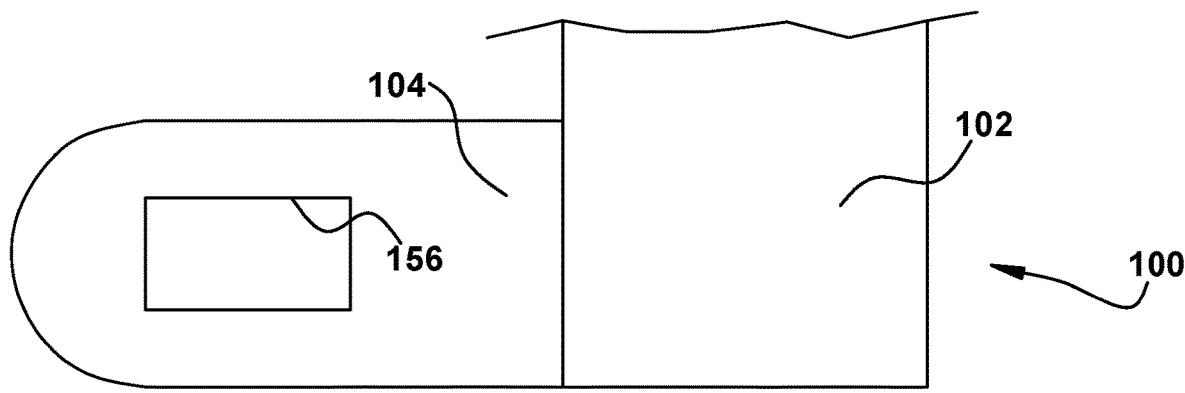
FIG. 6 is a side view of the portion of the anchor assembly illustrated in FIG. 4.
Figure 7:
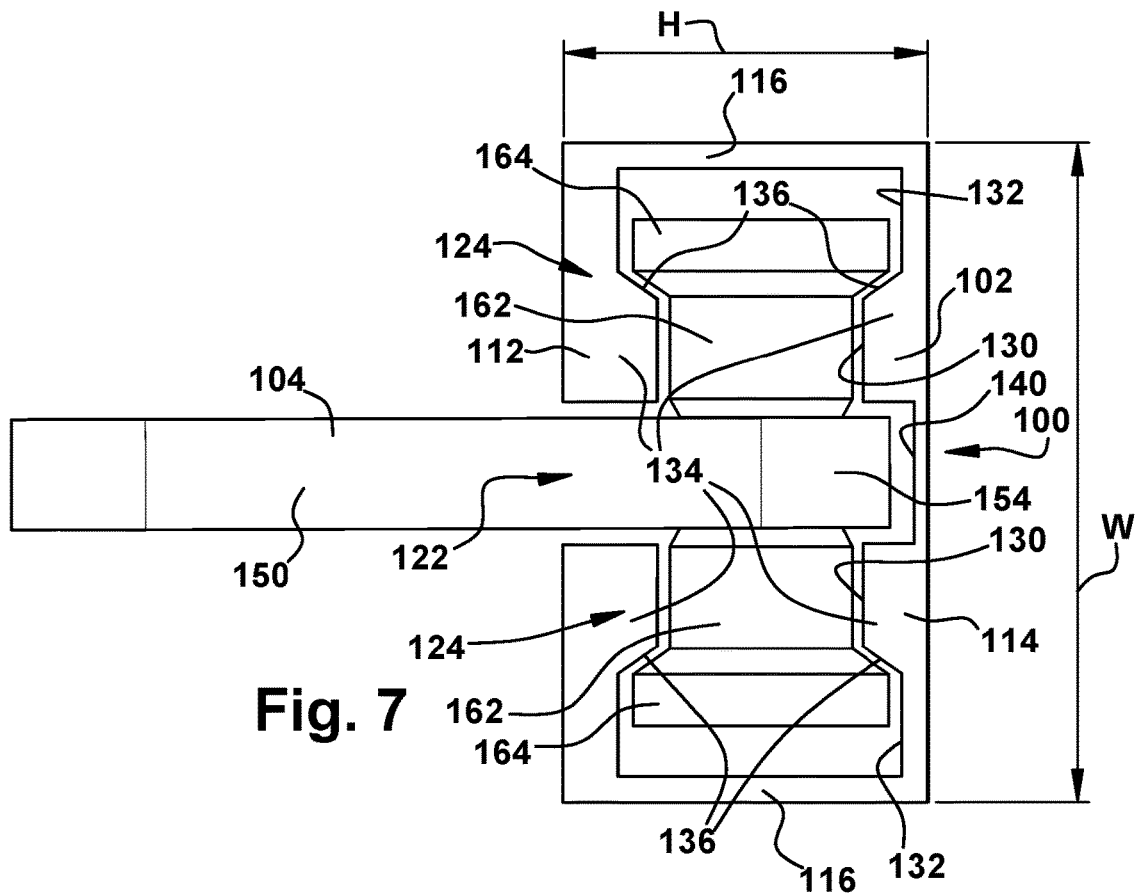
FIG. 7 is an end view of the portion of the anchor assembly illustrated in FIG. 4.

FIG. 3 illustrates the general form of the anchor assembly 100. A first example configuration of the anchor assembly 100 is illustrated in FIGS. 4-8. As shown in these figures, the track 102 has a width W dimension and a height H dimension. Top and bottom walls 112, 114 extend across the width W of the track 102. Side walls 116 extend along the height of the track 102. The track 102 includes a channel 120 that is defined by the top wall 112, bottom wall 114, and side walls 116. The channel 120 is configured to receive the anchor 104, allowing it to slide, roll, or otherwise move along its length.

In the example configuration of FIGS. 4-8, the channel 120 has a generally closed, C-shaped configuration, forming or defining a centrally positioned slot 122 in the top wall 112, that extends lengthwise along the track 102. A rectangular groove 140 in the bottom wall 114 extends lengthwise along the track 102. Roller receiving portions 124 of the channel 120 are positioned on opposite sides of the slot 122. Each roller receiving portion 124 has an inner portion 130 positioned at the slot 112 and an adjacent outer portion 132 positioned adjacent a respective one of the side walls 116.

The inner portion 130 is formed by raised portions 134 of the top and bottom walls 112, 114 in opposing pairs on opposite sides of the slot 112. The raised portions 134 extend toward each other, terminating with flat surfaces arranged parallel to each other and positioned comparatively close to each other. This gives the inner portion 130 a generally narrow rectangular configuration. The outer portion 132 is formed by portions of the top and bottom walls 112, 114 that are flat, arranged parallel to each other, and are spaced further from each other than the walls of the inner portion 130. The outer portion 132 thus has a comparatively widened rectangular configuration. The outer portion 132 thus has a height that is greater than the inner portion 130. The outer portion 132 also includes an angled wall portion 136 that extends between the rectangular surfaces of the inner and outer portions 130, 132.

The anchor 104 includes a shank 150 and a roller 160. The shank 150 has a plate shaped configuration that is generally rectangular with opposite end portions 152, 154 that are rounded with a semi-circular edge. A tether opening 156 for receiving and securing the anchoring tether 106 extends through the thickness of the shank 150 at or near the first end portion 152. A roller opening 158 extends through the thickness of the shank 150 at or near the second end portion 154.

Figure 8:
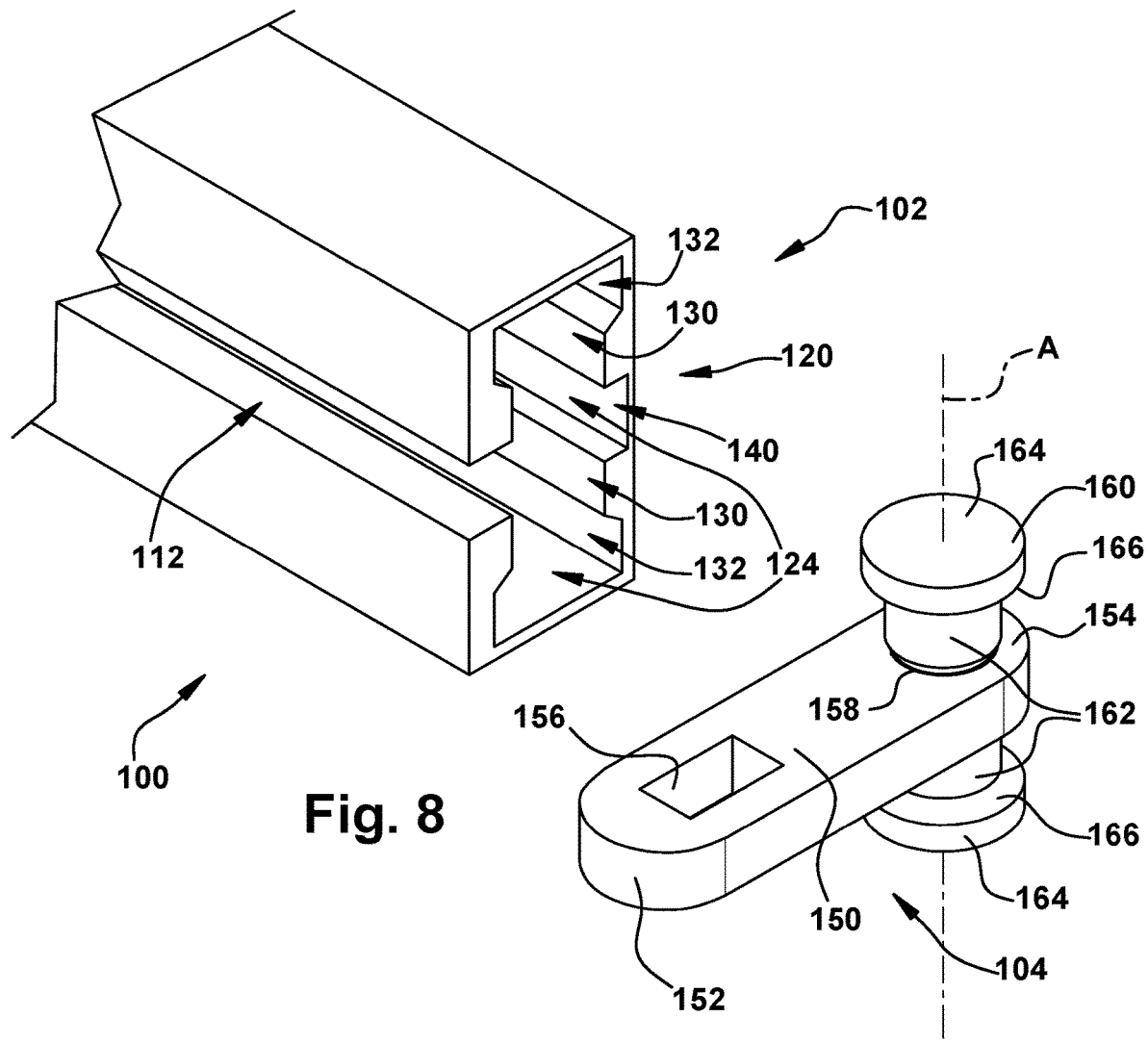
FIG. 8 is a magnified exploded perspective view illustrating a portion of the anchor assembly.

The roller 160 extends through the roller opening 158 of the shank 150 and is configured to rotate relative to the shank about a roller axis A (see FIG. 8). The roller 160 includes inner roller portions 162 positioned on opposite sides of the shank 150 and outer roller portions 164 positioned adjacent and outboard of the inner roller portions. The inner and outer roller portions 162, 164 are cylindrical in form, with the diameter of the inner roller portions being smaller than the diameter of the outer roller portions. A shoulder surface 166 extends at an angle from the inner roller portion 162 to the outer roller portion 164.

The roller 160 also includes a shaft portion 168 that extends between the inner roller portions 162. It is the shaft portion 168 that extends through and is positioned in the roller opening 158 of the shank 150. Both the shaft portion 168 and the roller opening 158 have diameters that are smaller than the diameters of the inner roller portions 162. Accordingly, there is a clearance between the shaft portion 168 and the roller opening 158, and an interference between the inner roller portions 162 and the roller opening. This effectively retains the roller 160 in the shank 150, with the roller opening 158 and shaft portion 168 acting as a journal bearing for facilitating rotation of the roller relative to the shank.

In an assembled condition of the anchor assembly 100, the anchor 104 is received in the channel 120 of the track 102. The outer roller portions 164 are received in the outer portions 132 of the roller receiving portions 124. The inner roller portions 166 are received in the inner portions 130 of the roller receiving portions 124. The contour of the roller portions 164, 166 are similar to the roller receiving portions 124, except that the roller receiving portions are dimensioned larger than the roller portions, so as to create a clearance that permits the anchor 104 to a) move freely within the track 102, and b) pivot relative to the track about a longitudinal axis A of the track (see, e.g., FIG. 9).

The anchor assembly 100 can be installed in the vehicle by connecting the track 102 to the vehicle structure via the mounting tabs 108. When the airbag module 62 is installed in the vehicle 12 (see FIGS. 1 and 2), the tether 106 can be connected to the shank 150 to connect the airbag 50 to the anchor assembly 100. The apparatus 10, i.e., the airbag module 62 and the anchor assembly 100 can thereafter be concealed behind vehicle trim pieces, such as B-pillar trim pieces and roof rail trim pieces and/or a headliner 186.

The components of the anchor assembly 100 can have a variety of material constructions. Advantageously, the track 102 has an even, uniform cross-sectional configuration along its length, which allows it to be constructed of an extruded plastic or polymeric material in an efficient and cost-effective manner. For example, the track 102 can be extruded with a polyamide (PA) material, such as polyamide 6 (PA6) or polyamide 66 (PA66) material. In either instance, the PA material can include additives, such as glass fiber reinforcements, to improve its performance.

The anchor 104 also lends well to a PA construction, using the same or similar PA materials, i.e., a PA6/PA66 material with optional additives, used to construct the track 102. The shank 150 and the roller 160 are both suited for manufacture via injection molding. Advantageously, the anchor 104 can be manufactured using an insert molding procedure in which the shank 150 is manufactured first. After cooling, the shank 150 can be placed in an insert mold, and the roller 160 can be injection molded with the shaft portion 168 positioned in the roller opening 158 and the adjacent inner roller portions 162 forming the interference that maintains the anchor 104 in the assembled condition. Alternatively, the roller 160 can be manufactured as a two-piece component, with screw threads or a pin/socket connector that facilitates assembling the roller with the shaft portion 168 positioned in the roller opening 158.

When the inflator 60 is actuated and the curtain airbag 50 begins to deploy, it draws with it the anchor 104, which moves along the track 102 toward the deployed condition (see FIG. 2). The anchor assembly 100 restrains the curtain airbag 50 against outboard movement, e.g., through the window opening 42 in response to the occupant 14 moving toward the vehicle side structure 38. The vehicle safety system 10 can therefore help protect against occupant ejection.

Owing to this anti-ejection functionality, it can be desirable that the anchor assembly 100 resists upward movement that would, in effect, uncover the window opening 42. While latching or spring-biased pawl mechanisms can be used to block upward movement, such mechanisms add complexity in both manufacturing and installation, as well as cost to the system. Advantageously, the anchor assembly 100 can be configured to provide this functionality with the comparatively simple construction described above.

Figure 9:
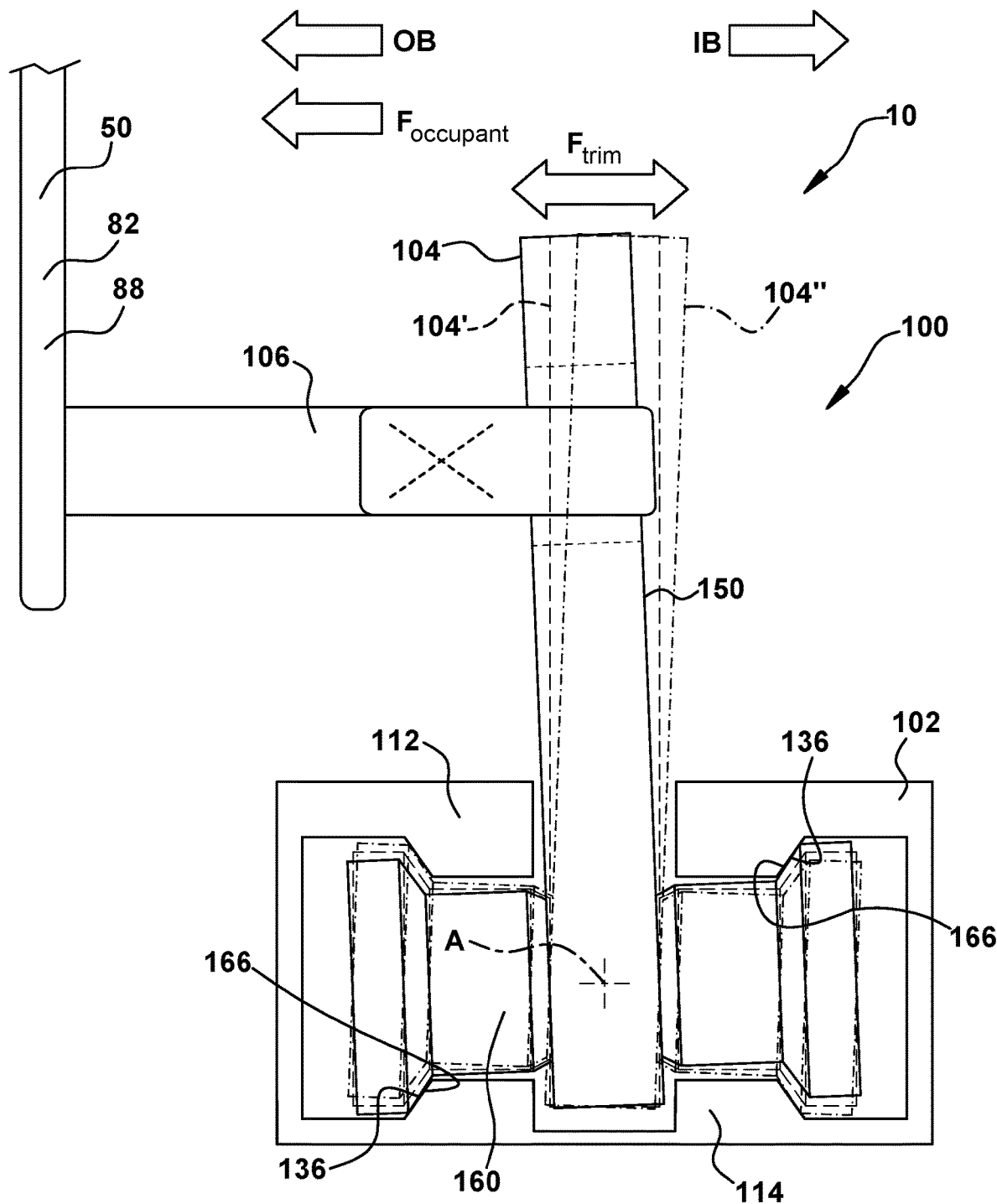
FIG. 9 is an end view illustrating the operation of the anchor assembly.

Referring to FIG. 9, occupant forces (arrow $F_{OCCUPANT}$) acting on the curtain airbag 50 can cause the anchoring tether 106 to pull on the anchor 104 in the outboard direction (arrow OB). Vehicle trim pieces forces (arrow $F_{TRIM}$) acting on the shank 150/anchor 104 can push or pull the anchor in either direction, based on the dynamics of deployment and the vehicle crash scenario. To account for this, the anchor assembly 100 is configured so that there is a clearance between the track 102 and the anchor 104. The clearance can be exaggerated in FIG. 9 so that the surfaces of the components can be viewed easily. The clearance allows the anchor 104 to pivot relative to the track 102 generally about the longitudinal axis A of the track.

In FIG. 9, the anchor is shown pivoted outboard in solid lines at 104. The center or "normal" position of the anchor is shown in dashed lines at 104'. An inboard pivoted position of the anchor is shown in dashed lines at 104". When the anchor 104 pivots in either direction, the angled shoulder surfaces 166 of the roller 160 on opposite sides of the shank 150 engage an angled wall surface 136 on the front wall 112 of the track and an angled wall surface on a back wall 114 of the track.

As best shown in the outboard pivoted position illustrated in solid lines at 104 in FIG. 9, the angled wall surface 136 and angled shoulder surface 166 can be configured so that those surfaces mate flat or substantially flat against each other when the anchor is pivoted. To achieve this purpose, the angle of the wall surface 136 and the angle of the shoulder surface 166 (both relative to horizontal) might not be equal. For example, the difference between the angles of surfaces 136 and 166 might be equal to the angle that the anchor 104 pivots relative to the track 102. This difference can produce the flat engagement of the surfaces 136, 166 when the anchor pivots in either direction, i.e., outboard 104' or inboard 104".

The engagement between the surfaces 136, 166 is beneficial to the anti-ejection functionality of the anchor assembly 100. The anchor 104, particularly the roller 160, pivoted as shown in FIG. 9, becomes wedged in the track 102, which causes the anchor to resist upward movement along the track. Additionally, because the roller 160 is configured to roll along the track 102, the engagement between the shoulder surfaces 166 and wall surfaces 136 being on the opposite track walls 112, 114 causes the rolling directions on those sides of the track to be opposite. This opposition reinforces the sliding frictional engagement between the anchor 104 and the track 102. The frictional engagement can be further heightened through the materials selected to construct the track 102 and anchor 104.

Because of this, when the curtain airbag 50 is loaded by the force F of an occupant moving in the outboard OB direction, the anchor assembly 100 will resist upward movement of the anchor 104 and, therefore, the airbag. As a result, the anchor assembly 100 can anchor the lower edge portion 82 of the curtain airbag 50 against both outboard movement and upward movement and therefore help protect against occupant ejection while.

Figure 10A:
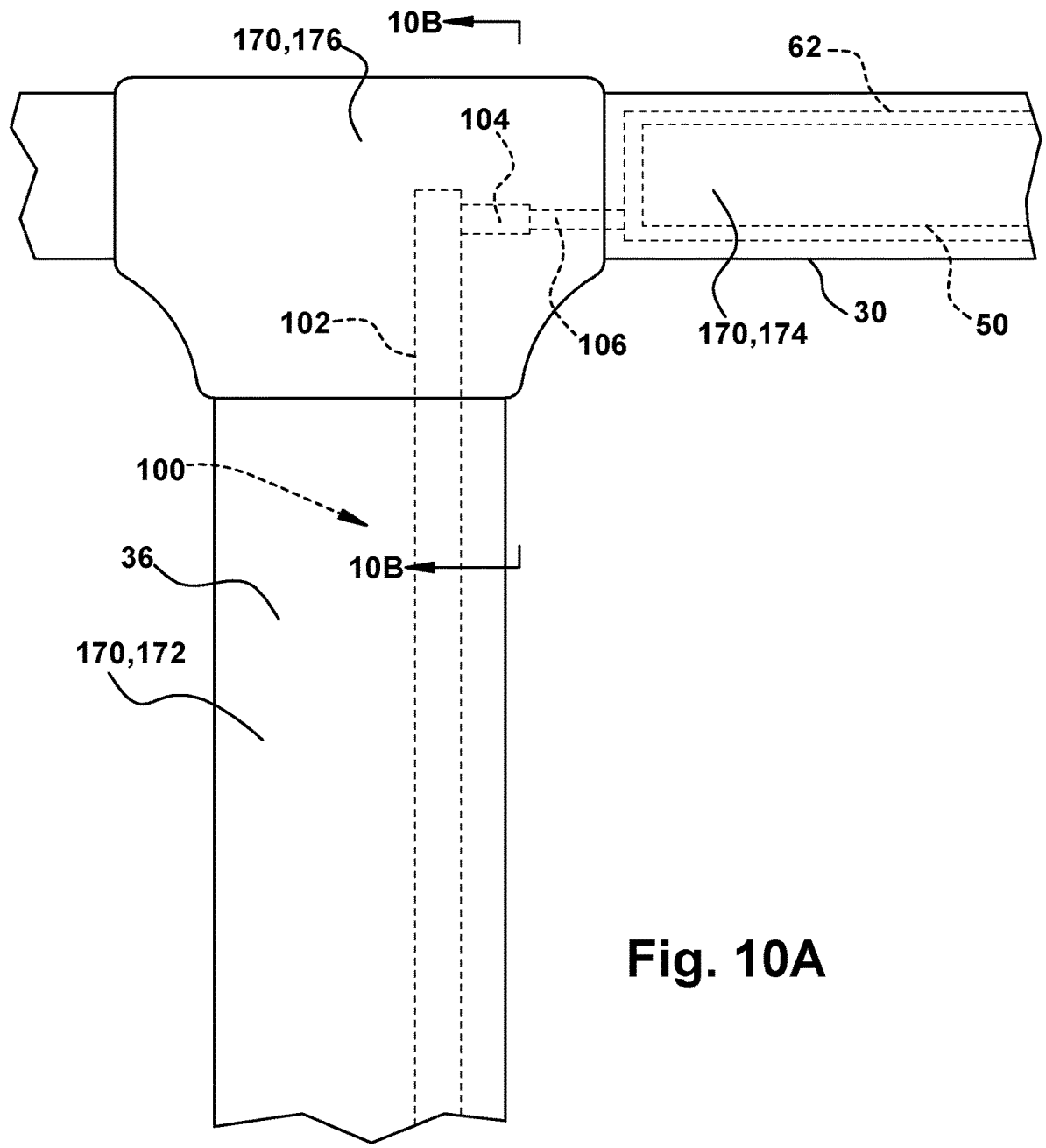
FIGS. 10A and 10B are schematic illustrations depicting the anchor assembly installed in a vehicle and concealed by vehicle trim pieces.
Figure 10B:
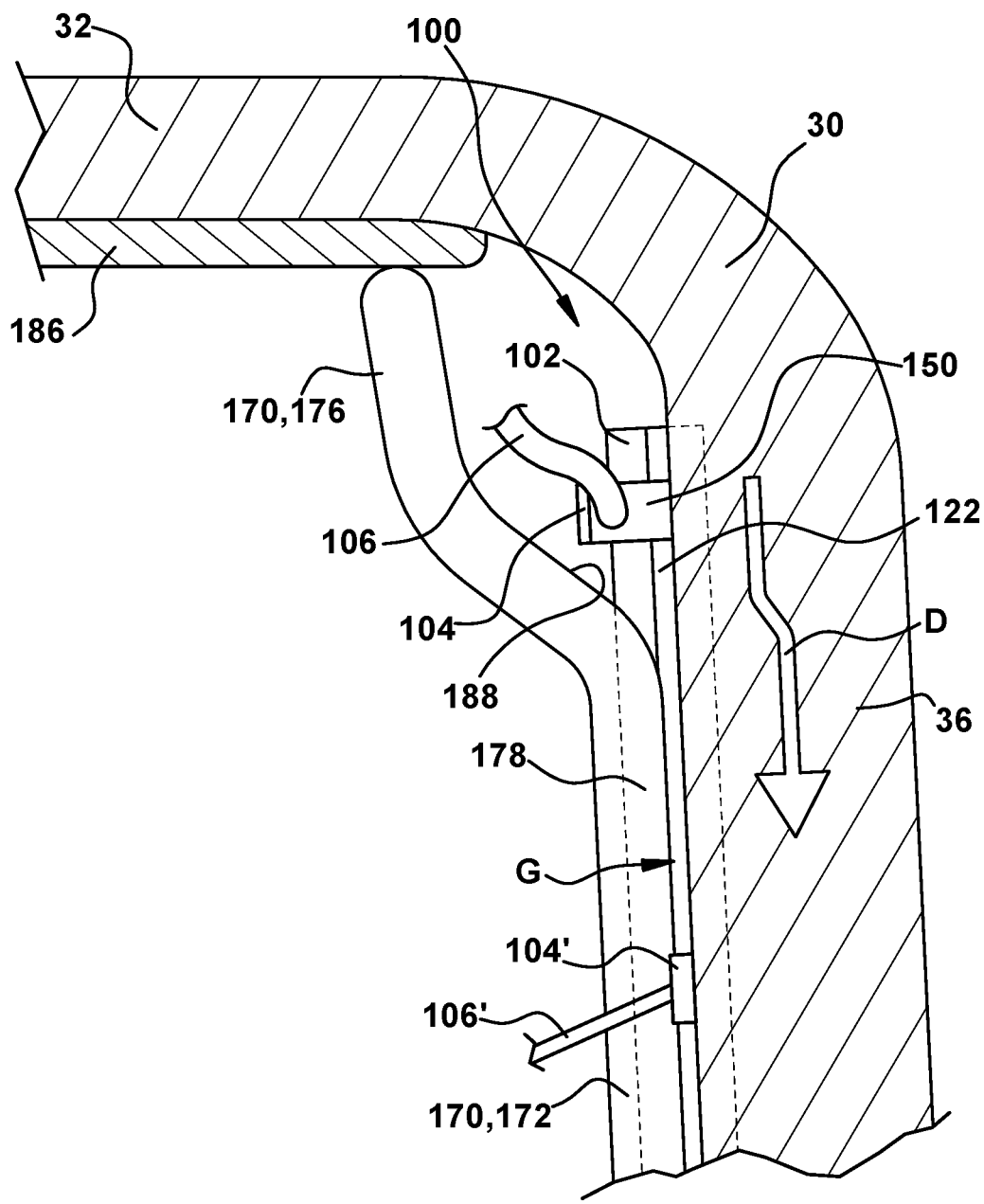

Additionally, the anchor assembly 100 is also configured to cooperate with the vehicle trim pieces behind which the assembly is located in order to facilitate concealing the assembly prior to use and also avoiding the trim piece when the curtain airbag 50 is deployed. Referring to FIGS. 10A and 10B, the vehicle can include trim pieces 170 that conceal the vehicle structure and provide a class A surface visible from the passenger compartment. In the example configuration of FIG. 10, the trim pieces 170 include a B-pillar trim piece 172 configured to cover the B-pillar 36, a roof rail trim piece 174 configured to cover the roof rail 30, and A-pillar cap trim piece 176 configured to cover the intersection of the B-pillar and roof rail at the edge of the headliner 186.

As can be seen in FIGS. 10A and 10B, the anchor assembly 100 is concealed behind the trim pieces 170. In the stored condition of FIG. 10, i.e., prior to airbag deployment, the portions that extend between the track 102 and the airbag module 62—the anchor 104 and the anchoring tether 106— are concealed behind the cap trim piece 176 and the roof rail trim piece 174. To facilitate proper inflation and deployment of the airbag 50, the anchor 104 and tether 106 must be free to deploy, i.e., move, along the B-pillar 36 to the deployed position. At the same time, a requisite degree of aesthetics must be maintained. By this, it is meant that the anchor assembly 100, particularly the track 102, must be covered or at least substantially covered by the trim pieces 170 or other available vehicle structure in order to maintain the visible aesthetics and also to protect the anchor assembly from unwanted exposure to rain, etc. Advantageously, the anchor assembly 100 is configured to promote cooperation with the vehicle trim pieces 170 (and other structures, such as weatherstripping, as described below).

Because it is desirable for the anchor 104 to move along the track 102 with low resistance, the trim pieces 170 can be configured so there is a gap G at the edge 178 of the B-pillar trim piece 172 along which the anchor can move. While the gap G serves the purpose of promoting movement of the anchor 104 along the track 102, it cannot be left open, because it would a) be visible and not aesthetically pleasing, and b) would leave the anchor assembly 100 exposed. To account for this, the gap G is covered by structures that permit movement of the anchor 104 along the track 102 while, at the same time, providing an aesthetic covering for the gap and limiting its exposure to the elements.

Figure 11A:
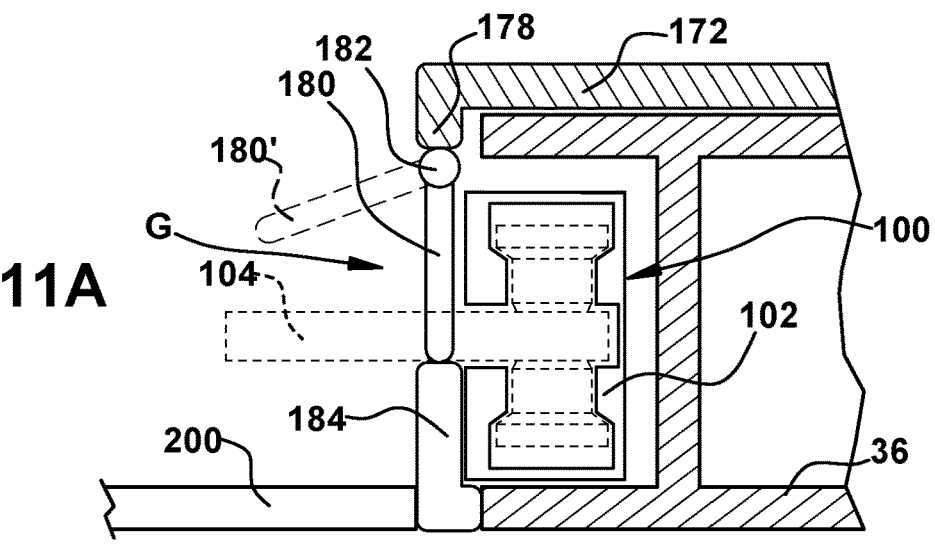
FIGS. 11A-11C are top views illustrating alternative structures for concealing the anchor assembly behind the trim pieces.
Figure 11B:
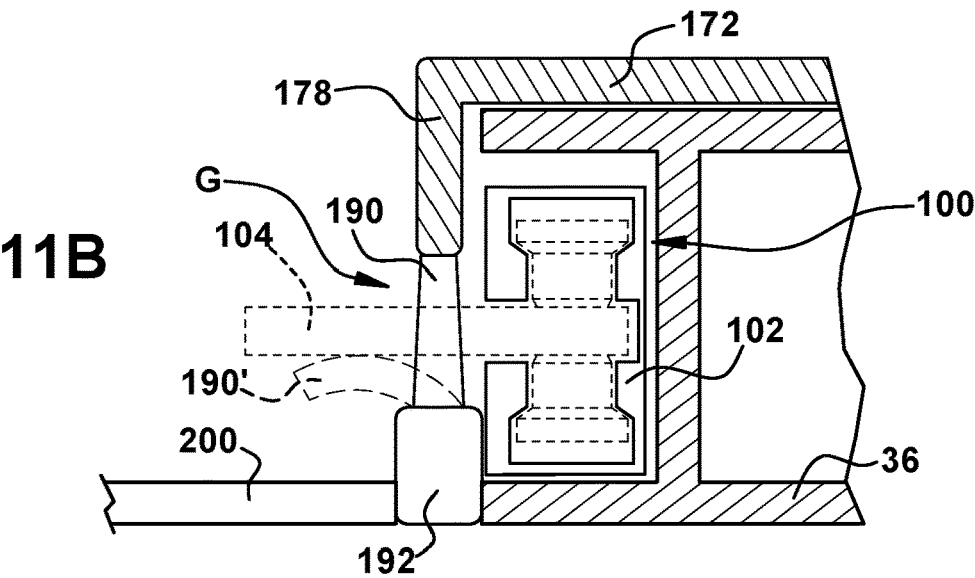
Figure 11C:
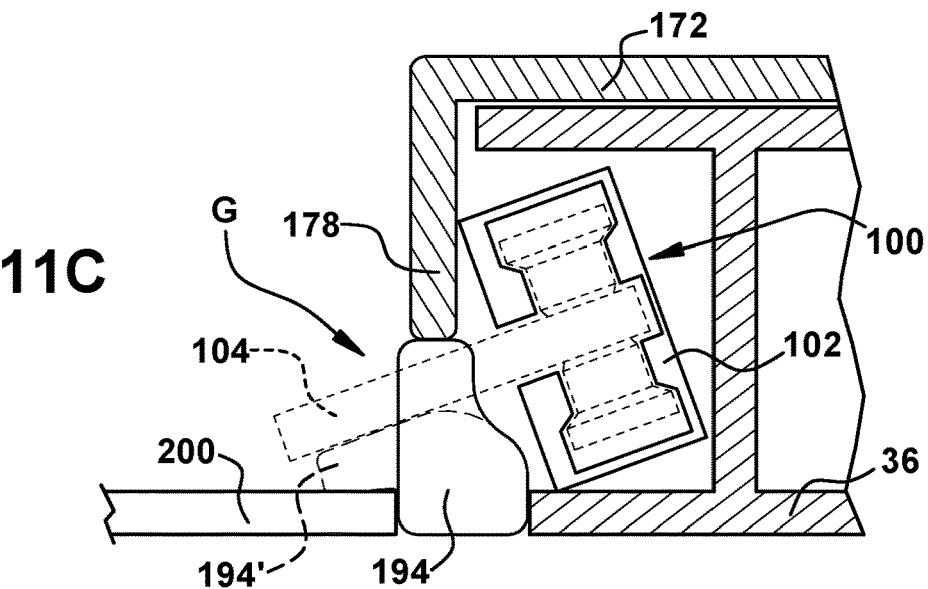
Figure 12:
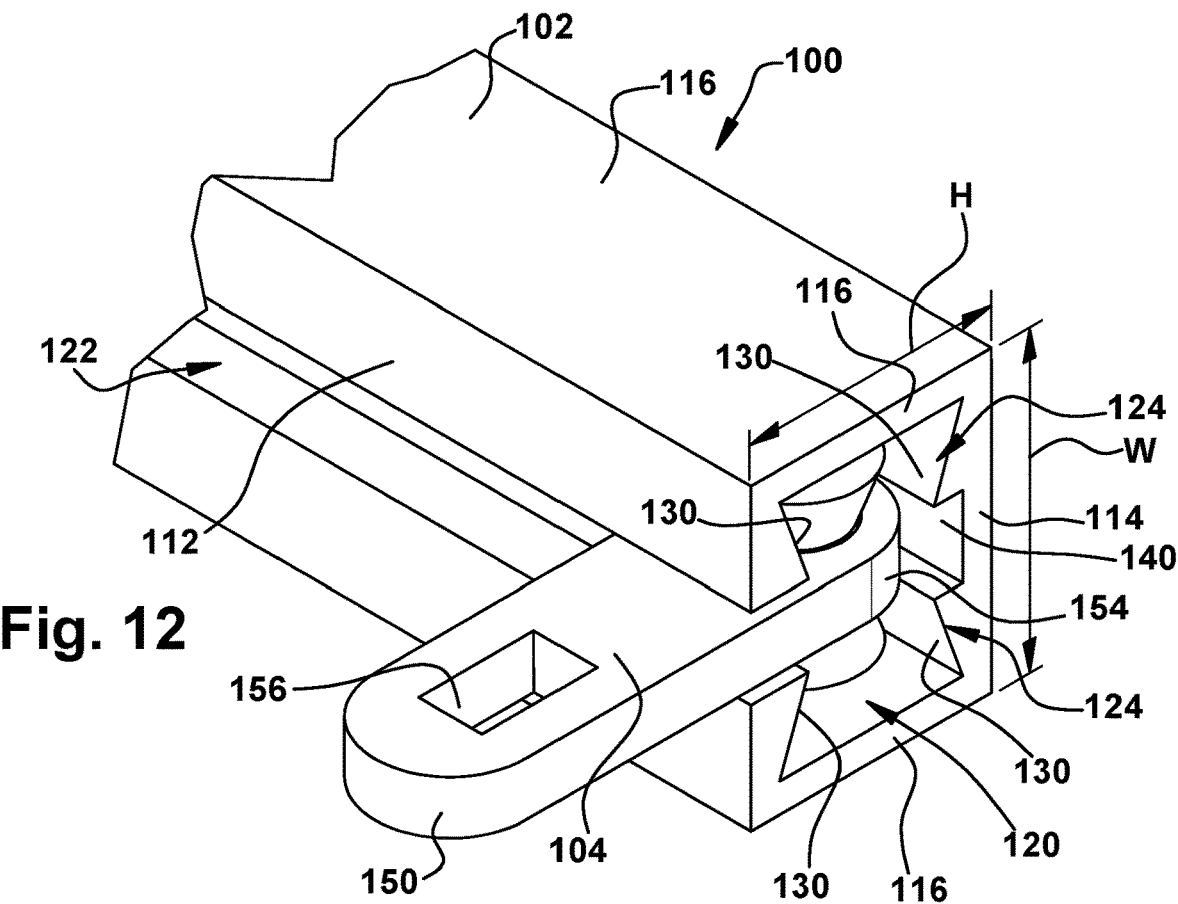
FIG. 12 is a magnified perspective view illustrating a portion of the anchor assembly according to an alternative example configuration of the invention.
Figure 13:
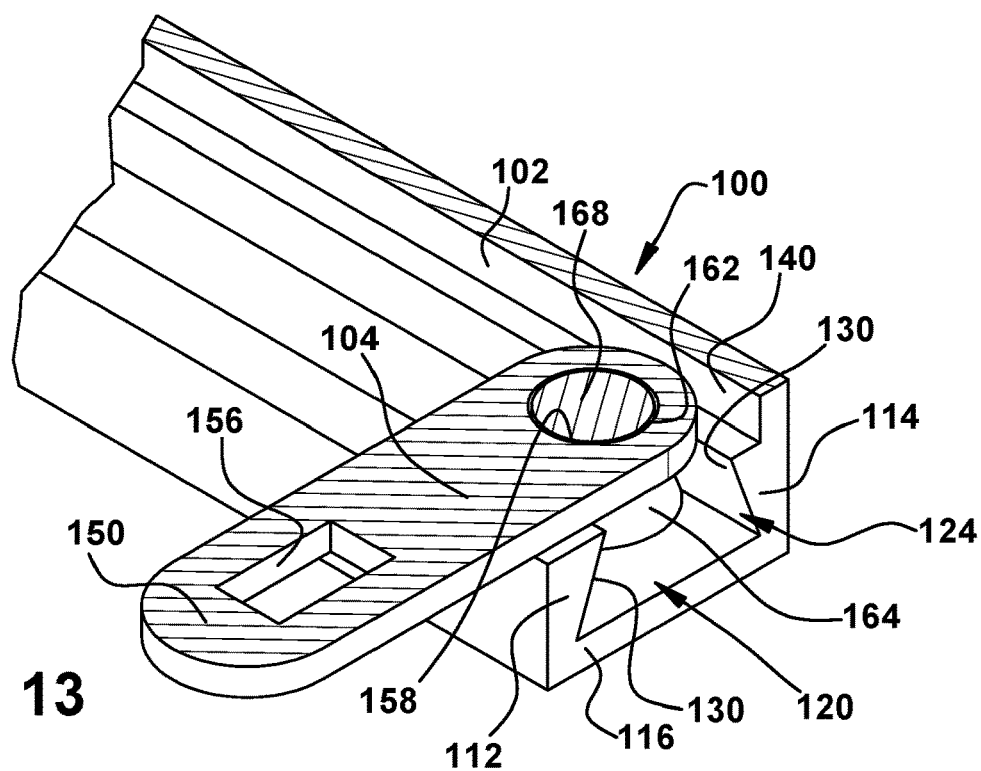
FIG. 13 is a sectional view of the portion of the anchor assembly illustrated in FIG. 12.
Figure 14:
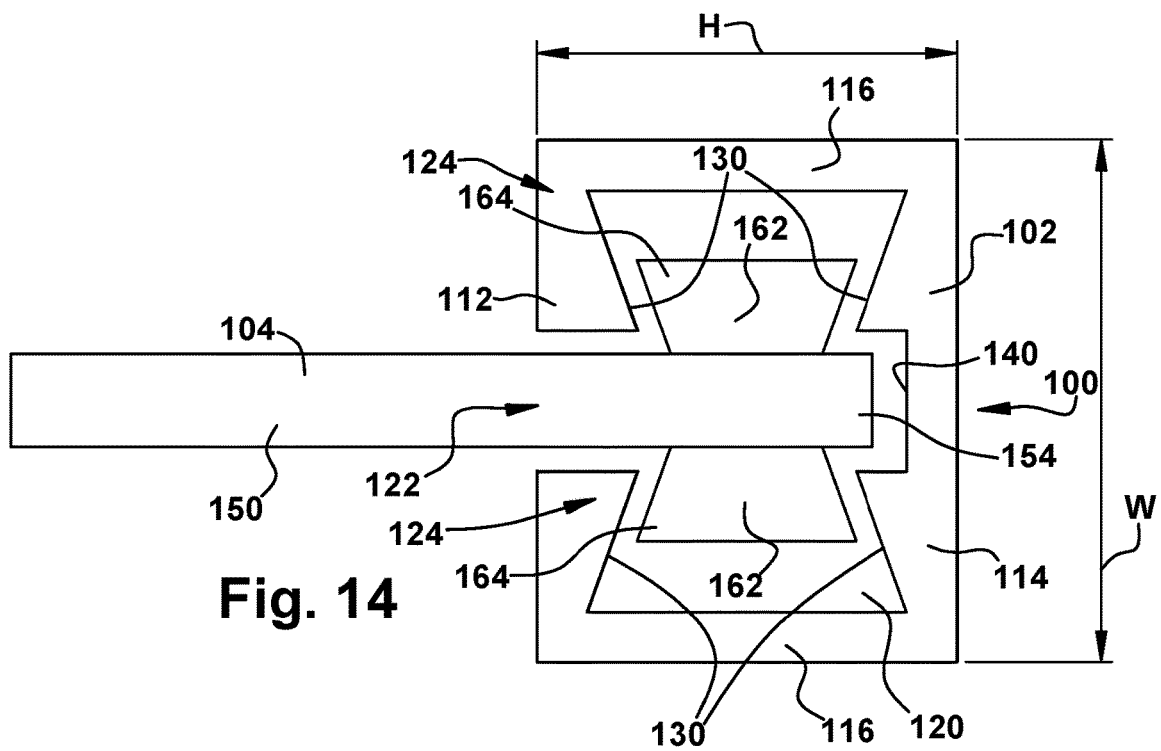
FIG. 14 is an end view of the portion of the anchor assembly illustrated in FIG. 12.
Figure 15:
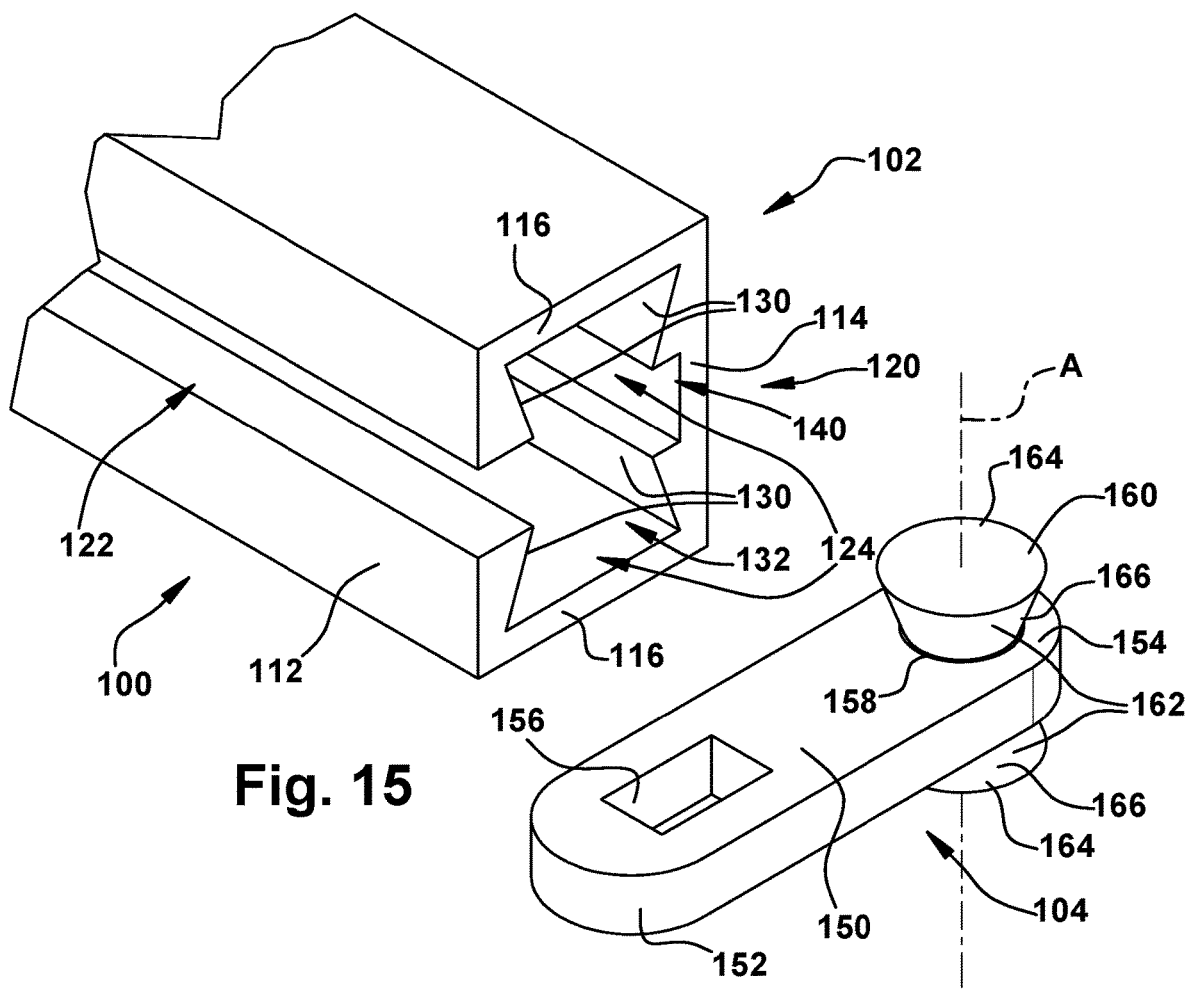
FIG. 15 is a magnified exploded perspective view illustrating a portion of the anchor assembly of FIG. 12.

FIGS. 11A-C illustrate optional configurations for concealing the anchor assembly 100 behind in the B-pillar trim piece 172. The B-pillar 36 either interfaces with the structure forming the window opening 42 covered by the curtain airbag 50 or itself forms a portion of the window opening (see, FIG. 1). By interfacing with structure forming the window opening 42, it is meant that the B-pillar 36 interfaces with the vehicle side door 40, which forms the window opening. When the B-pillar 36 itself forms a portion of the window opening, it interfaces with the window 44 itself. Whether the B-pillar 36 interfaces with the side door 40 or window opening 44 depends on the configuration of the vehicle and whether the door includes a window frame extending along the B-pillar 36. For this reason, the structure 200 that interfaces the B-pillar 36 in FIGS. 11A-11C is shown schematically and can represent either the side door 40 or the side window 44.

Referring to FIG. 11A, a structure 180, such as a door or flap, can help cover the anchor assembly 100/track 102. The structure 180 can pivot about a hinge portion 182 from a closed condition, illustrated in solid lines at 180, to an open condition illustrated in dashed lines at 180'. In the closed condition, the structure 180 structure isolates the anchor assembly 100. In the open condition, the structure 180' allows the anchor 104 to move along the track 102. As shown in FIG. 11A, in the closed condition, the structure 180 can extend from the edge 178 of the trim piece 172 and interface with a seal or weatherstripping 184 that helps provide a seal with the vehicle structure 200 adjacent the B-pillar 36. The weatherstripping 184 also helps cover a portion of the anchor assembly 100, particularly the track 102.

By extending from the trim piece 172 to the weatherstripping 184, the structure 180 covers the gap G. The hinge portion 182 can be configured to promote the pivoting of the structure 180 with a low resistance so that the anchor 104 can easily displace the structure and move easily along the track 102. Displacing or opening the structure 180 can be facilitated by an angled ramp surface at the upper extent of the door that initially engages the anchor 104, creating an opening force as it slides along the track 102. At the same time, the anchor 104 moves along the gap G, so there is little or no interference between the anchor/shank 150 and the trim piece 172 or the vehicle structure 200. To achieve this, the hinge portion 182 can be mechanical in nature, e.g., a conventional mechanical hinge, or can be formed via its material construction, e.g., a soft compliant material that bends or deflects readily when a force is applied to the structure 180.

Referring to FIG. 11B, a deflectable structure 190 can help cover the anchor assembly 100/track 102. The structure 190 can be constructed of a deflectable material, such as a foam, rubber, foamed rubber, or other elastomeric material, that allows it to provide an effective seal for the anchor assembly 100. The deflectable material construction allows the structure 190 to deflect about a base portion 192 from a closed condition, illustrated in solid lines at 190, to an open condition illustrated in dashed lines at 190'.

In the closed condition, the structure 190 structure isolates the anchor assembly 100. In the open condition, the structure 190' allows the anchor 104 to move along the track 102. As shown in FIG. 11B, the deflectable structure 190 and the base portion 192 can, in combination, form a seal or weatherstripping that helps provide a seal with the vehicle structure 200 adjacent the B-pillar 36. The weatherstripping also helps cover a portion of the anchor assembly 100, particularly the track 102. The material construction of the structure 190 can be such that the anchor 104 can easily displace the structure when moving along the track 102. At the same time, the anchor 104 moves along the gap G, so there is little or no interference between the anchor/shank 150 and the trim piece 172 or the vehicle structure 200.

Referring to FIG. 11C, weatherstripping 194 forms a seal between the B-pillar 36 and the adjacent vehicle structure 200 (side door 40 or window 44). As shown in FIG. 11A, the weatherstripping is secured to the B-pillar 36 or sheet metal attached thereto and helps form a weather-tight seal when the door is closed. The weatherstripping 194 extends along the length of the interfacing structures, i.e., the B-pillar 36 and the door 40/window 44. The weatherstripping 184 also helps cover a portion of the anchor assembly 100, particularly the track 102. This configuration is made possible by the orientation of the anchor assembly 100 on the vehicle.

The weatherstripping 194 of FIG. 11C can be a conventional weatherstripping configured to interface with the B-pillar trim piece 172. In this manner, the configuration of the weatherstripping 194 and B-pillar trim piece 172 can be left unaltered or substantially unaltered from a conventional design. This allows for the visual appearance of the trim and weatherstripping to be left unchanged. It is the orientation of the anchor assembly 100 that allows for this configuration of the weatherstripping 194 and trim piece 172. Because of this orientation, when the anchor assembly 100 is actuated, the anchor 104 engages only a small portion of the weatherstripping 194.

The weatherstripping 194 can be constructed of a conventional weatherstripping material, such as a foam, rubber, foamed rubber, or other elastomeric material, that allows it to provide an effective seal for both the vehicle structure 200 and the anchor assembly 100. The deflectable material construction allows the weatherstripping 194 to deflect in response to movement of the anchor 104 along the track 102. As a result, the weatherstripping 194 deflects from a normal condition illustrated in solid lines at 194 to a deflected condition illustrated in dashed lines at 194'. This deflection allows the anchor 104 to move along the track 102 in response to airbag deployment with little resistance offered by the weatherstripping 194. The material construction of the weatherstripping 194 can be such that the anchor 104 can easily displace the weatherstripping when moving along the track 102. At the same time, the anchor 104 moves along the gap G, so there is little or no interference between the anchor/shank 150 and the trim piece 172 or the vehicle structure 200.

Additionally, regardless of the structure that covers the gap G, the configuration of the track 102 and anchor 104 can be such that the pivot of the anchor relative to the track helps maintain the shank 150 positioned in the gap G as it moves along the track. As the crash event ensues, the vehicle structure 200 and the trim piece 172 can be deflected or deformed. As this occurs, the anchor 104 is moving along the track 102 in response to the curtain airbag 50 being deployed in response to the sensed crash event. Because the curtain airbag 50 deploys so rapidly, it can be fully deployed at the early stages of the crash event, when the vehicle structure 200 and trim piece 172 are at the early stages of deformation. The provision of the gap G and the anchor assembly 100 being configured so that the anchor 104 pivots in the track 102 can therefore help ensure that the curtain airbag reaches the fully deployed position.

Second Example Configuration

A second example configuration of the anchor assembly 100 is illustrated in FIGS. 12-15. The anchor assembly 100 of FIGS. 12-15 is similar in some respects, dissimilar in other respects, and identical in some respects to the anchor assembly of FIGS. 4-8. Because of this, similar or identical components and features in the example configuration of FIGS. 12-15 are identified with the same reference numbers used in FIGS. 4-8, with new reference numbers added for new features, added features, or dissimilar features. The track 102 has a width W dimension and a height H dimension. Top and bottom walls 112, 114 extend across the width W of the track 102. Side walls 116 extend along the height of the track 102. The track 102 includes a channel 120 that is defined by the top wall 112, bottom wall 114, and side walls 116. The channel 120 is configured to receive the anchor 104, allowing it to slide, roll, or otherwise move along its length.

In the example configuration of FIGS. 12-15, the channel 120 has a generally closed, C-shaped configuration, forming or defining a centrally positioned slot 122 in the top wall 112, that extends lengthwise along the track 102. A rectangular groove 140 in the bottom wall 114 extends lengthwise along the track 102. Roller receiving portions 124 of the channel 120 are positioned on opposite sides of the slot 122. Each roller receiving portion 124 has a generally trapezoidal configuration with sidewalls 130 that taper from narrow to wide as they extend away from the slot 122.

The anchor 104 includes a shank 150 and a roller 160. The shank 150 has a plate shaped configuration that is generally rectangular with opposite end portions 152, 154 that are rounded with a semi-circular edge. A tether opening 156 for receiving and securing the anchoring tether 106 extends through the thickness of the shank 150 at or near the first end portion 152. A roller opening 158 extends through the thickness of the shank 150 at or near the second end portion 154.

The roller 160 extends through the roller opening 158 of the shank 150 and is configured to rotate relative to the shank about a roller axis A (see FIG. 8). The roller 160 includes roller portions 162 positioned on opposite sides of the shank 150. The roller portions 162 are frusto-conical in form, with small diameter portions positioned adjacent the shank 150. The diameters of the roller portions 162 thus increase as it extends outward from the shank 150.

The roller 160 also includes a shaft portion 168 that extends between the roller portions 162. It is the shaft portion 168 that extends through and is positioned in the roller opening 158 of the shank 150. The is effectively retains the roller 160 in the shank 150, with the roller opening 158 and shaft portion 168 acting as a journal bearing for facilitating rotation of the roller relative to the shank.

The components of the anchor assembly 100 can have a variety of material constructions. Advantageously, the track 102 has an even, uniform cross-sectional configuration along its length, which allows it to be constructed of an extruded plastic or polymeric material in an efficient and cost-effective manner. For example, the track 102 can be extruded with a polyamide (PA) material, such as polyamide 6 (PA6) or polyamide 66 (PA66) material. In either instance, the PA material can include additives, such as glass fiber reinforcements, to improve its performance.

The anchor 104 also lends well to a PA construction, using the same or similar PA materials, i.e., a PA6/PA66 material with optional additives, used to construct the track 102. The shank 150 and the roller 160 are both suited for manufacture via injection molding. Advantageously, the anchor 104 can be manufactured using an insert molding procedure in which the shank 150 is manufactured first. After cooling, the shank 150 can be placed in an insert mold, and the roller 160 can be injection molded with the shaft portion 168 positioned in the roller opening 158 and the adjacent roller portions 162 forming the interference that maintains the anchor 104 in the assembled condition. Alternatively, the roller 160 can be manufactured as a two-piece component, with screw threads or a pin/socket connector that facilitates assembling the roller with the shaft portion 168 positioned in the roller opening 158.

When the inflator 60 is actuated and the curtain airbag 50 begins to deploy, it draws with it the anchor 104, which moves along the track 102 toward the deployed condition (see FIG. 2). The anchor assembly 100 restrains the curtain airbag 50 against outboard movement, e.g., through the window opening 42 in response to the occupant 14 moving toward the vehicle side structure 38. The vehicle safety system 10 can therefore help protect against occupant ejection.

Owing to this anti-ejection functionality, it can be desirable that the anchor assembly 100 resists upward movement that would, in effect, uncover the window opening 42. While latching or spring-biased pawl mechanisms can be used to block upward movement, such mechanisms add complexity in both manufacturing and installation, as well as cost to the system. Advantageously, the anchor assembly 100 can be configured to provide this functionality with the comparatively simple construction described above.

Figure 16:
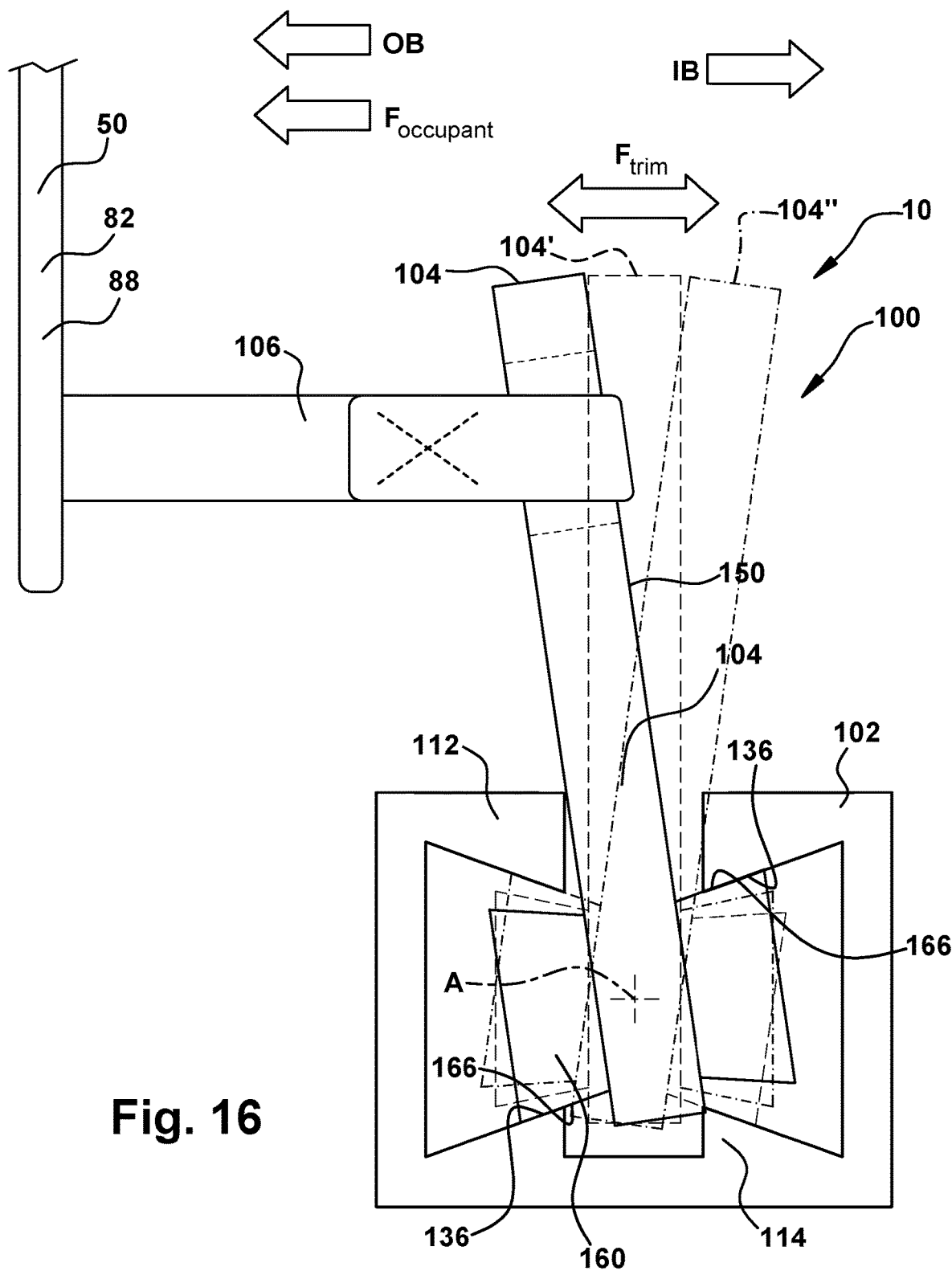
FIG. 16 is an end view illustrating the operation of the anchor assembly of FIG. 12.

Referring to FIG. 16, occupant forces (arrow $F_{OCCUPANT}$) acting on the curtain airbag 50 can cause the anchoring tether 106 to pull on the anchor 104 in the outboard direction (arrow OB). Vehicle trim pieces forces (arrow $F_{TRIM}$) acting on the shank 150/anchor 104 can push or pull the anchor in either direction, based on the dynamics of deployment and the vehicle crash scenario. To account for this, the anchor assembly 100 is configured so that there is a clearance between the track 102 and the anchor 104. The clearance can be exaggerated in FIG. 16 so that the surfaces of the components can be viewed easily. The clearance allows the anchor 104 to pivot relative to the track 102 generally about the longitudinal axis A of the track.

In FIG. 16, the anchor is shown pivoted outboard in solid lines at 104. The center or "normal" position of the anchor is shown in dashed lines at 104'. An inboard pivoted position of the anchor is shown in dashed lines at 104". When the anchor 104 pivots in either direction, the angled shoulder surfaces 166 of the roller 160 on opposite sides of the shank 150 engage an angled wall surface 136 on the front wall 112 of the track and an angled wall surface on a back wall 114 of the track.

As best shown in the outboard pivoted position illustrated in solid lines at 104 in FIG. 16, the angled wall surface 136 and angled shoulder surface 166 can be configured so that those surfaces mate flat or substantially flat against each other when the anchor is pivoted. To achieve this purpose, the angle of the wall surface 136 and the angle of the shoulder surface 166 (both relative to horizontal) might not be equal. For example, the difference between the angles of surfaces 136 and 166 might be equal to the angle that the anchor 104 pivots relative to the track 102. This difference can produce the flat engagement of the surfaces 136, 166 when the anchor pivots in either direction, i.e., outboard 104 or inboard 104".

The engagement between the roller portions 162 and the sidewalls 130 is beneficial to the anti-ejection functionality of the anchor assembly 100. The anchor 104, particularly the roller 160, pivoted as shown in FIG. 16, becomes wedged in the track 102, which causes the anchor to resist upward movement along the track. Additionally, because the roller 160 is configured to roll along the track 102, the engagement between the roller portions 162 and sidewalls 130 being on the opposite track walls 112, 114 causes the rolling directions on those sides of the track to be opposite. This opposition reinforces the sliding frictional engagement between the anchor 104 and the track 102. The frictional engagement can be further heightened through the materials selected to construct the track 102 and anchor 104.

Because of this, when the curtain airbag 50 is loaded by the force F of an occupant moving in the outboard OB direction, the anchor assembly 100 will resist upward movement of the anchor 104 and, therefore, the airbag. As a result, the anchor assembly 100 can anchor the lower edge portion 82 of the curtain airbag 50 against both outboard movement and upward movement and therefore help protect against occupant ejection while.

Like the anchor assembly 100 of FIGS. 4-8, the anchor assembly 100 of FIGS. 12-15 is also configured to cooperate with the vehicle trim pieces 170 behind which the assembly is located in order to facilitate concealing the assembly prior to use and also avoiding the trim piece when the curtain airbag is deployed. Because the differences between the anchor assembly 100 of FIGS. 12-15 differs from the anchor assembly 100 of FIGS. 4-8 only with respect to the internal components, i.e., the interior surfaces of the channel 120 of the track 102 and the portions of the roller 160 positioned in the channel, the manner in which the anchor assembly of FIGS. 12-15 cooperates with the vehicle trim pieces is at least substantially identical to that described above in regard to the anchor assembly of FIGS. 4-8 with reference to functionality illustrated in FIGS. 10A-B and 11A-C.

Advantageously, the pivot of the anchor 104 in the channel 120 can allow the pivotal position of the anchor to be adjusted in response to engagement with the vehicle trim pieces 170. This helps ensure that the shank 150, and the tether 106 attached to the shank, can be guided to move along the gap G between the edge 178 of the trim piece 172 and the vehicle structure (e.g., B-pillar 36) so that the curtain airbag 50 can deploy. For instance, as shown in FIG. 10B, the anchor 104 can be pivoted within the track 102 so that the shank 150 extends inboard, as shown. This can, for example, allow for the connection of the tether 106 to the shank 150, and the connection of the tether to the curtain airbag 50, where space near the roof rail 30 is tight. In this instance, if and when the curtain airbag 50 is deployed, the shank 150 can ride along an inner surface 188 of the trim pieces 170 so that the anchor 104 is directed into and deploys along the gap G, as indicated generally by the deployment arrow D.

Third Example Configuration

A third example configuration of the anchor assembly 100 is illustrated in FIGS. 17A-19. The anchor assembly 100 of FIGS. 17A-19 is similar in some respects, dissimilar in other respects, and identical in some respects to the anchor assembly of FIGS. 4-8 and 12-15. Because of this, similar or identical components and features in the example configuration of FIGS. 17A-19 are identified with the same reference numbers used in FIGS. 4-8 and 12-15, with new reference numbers added for new features, added features, or dissimilar features.

In the example configuration illustrated in FIGS. 17A-19, the configuration of the track 102 and anchor 104 is similar to that of FIGS. 12-15 in both construction and configuration, with the clearances in the channel 120 between the track 102 and anchor 104 being smaller than those shown in FIGS. 12-15. The specific configuration of the track 102 and anchor 104 is not critical and can vary. For example, in an alternative construction, the track 102 and 104 can be similar to that of FIGS. 4-8. The primary difference that sets the configuration of FIGS. 17A-19 apart from the others lies in the fact that the track 102 is mounted so that it, and thus the entire anchor assembly 100, pivots relative to the vehicle. It can therefore be seen that clearances between the track 102 and anchor 104 can be smaller in the configuration of FIGS. 17A-19 than those shown in FIG. 4-8 or 12-15.

Figure 17A:
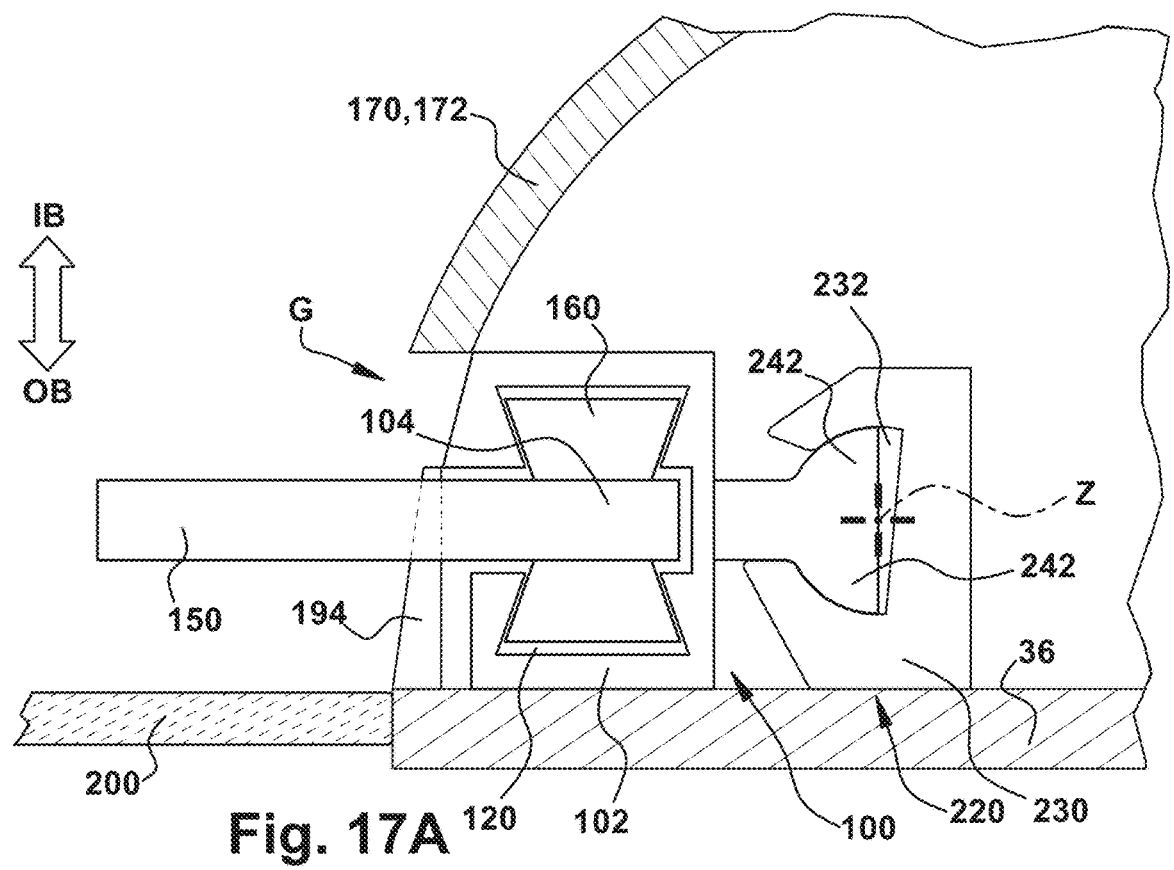
FIGS. 17A and 17B are top views illustrating a portion of the anchor assembly according to an alternative example configuration of the invention.
Figure 17B:
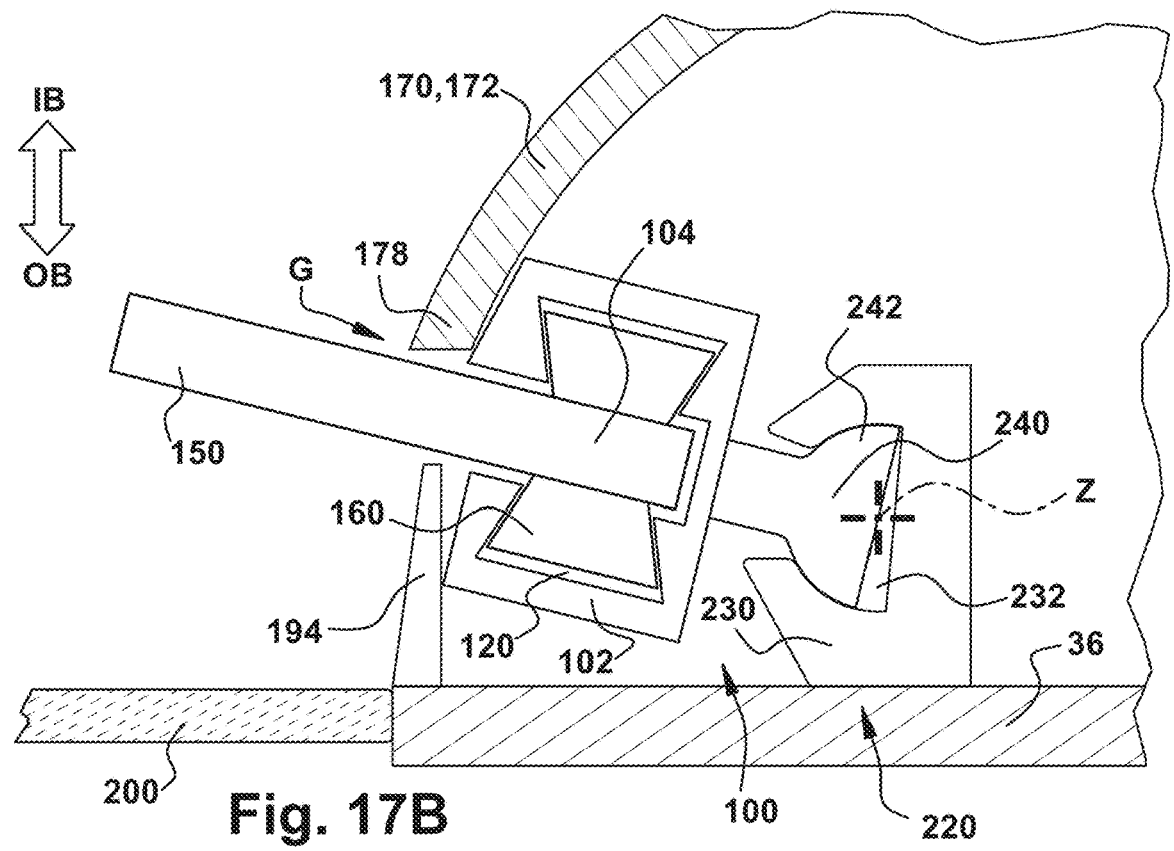
Figure 18:
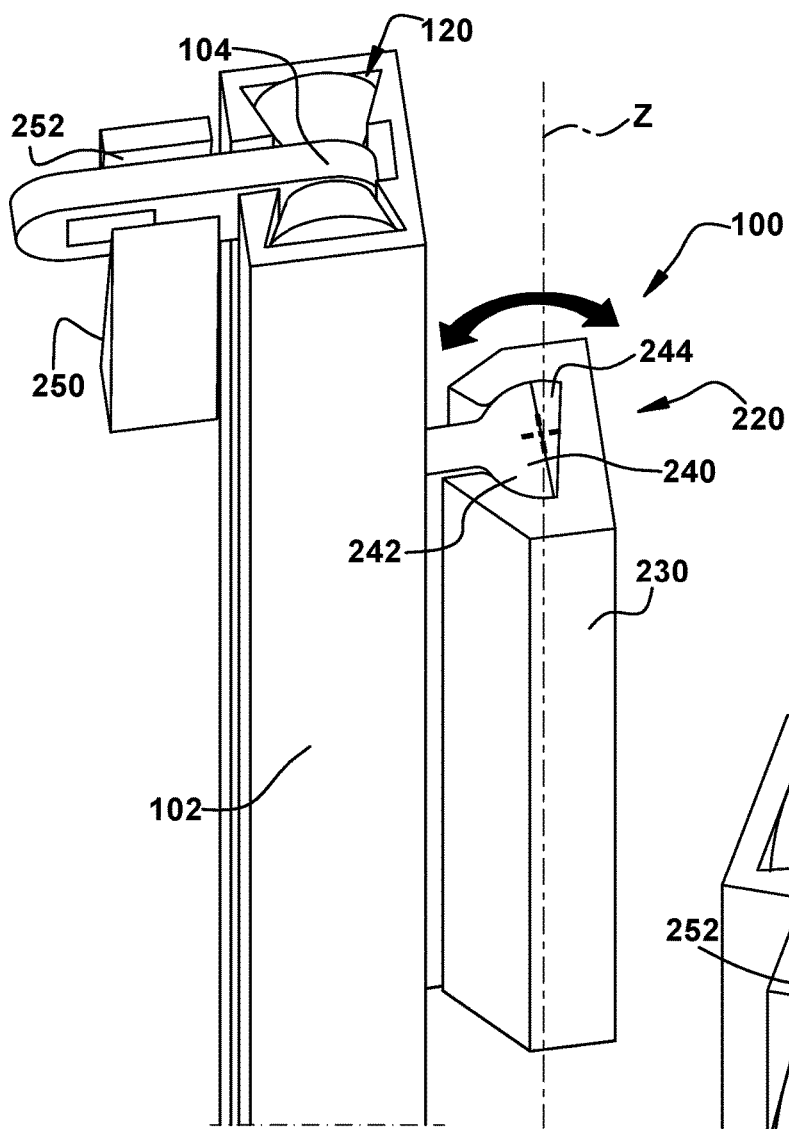
FIGS. 18 and 19 are perspective views illustrating the function of certain portions of the anchor assembly of FIGS. 17A and 17B.
Figure 19:
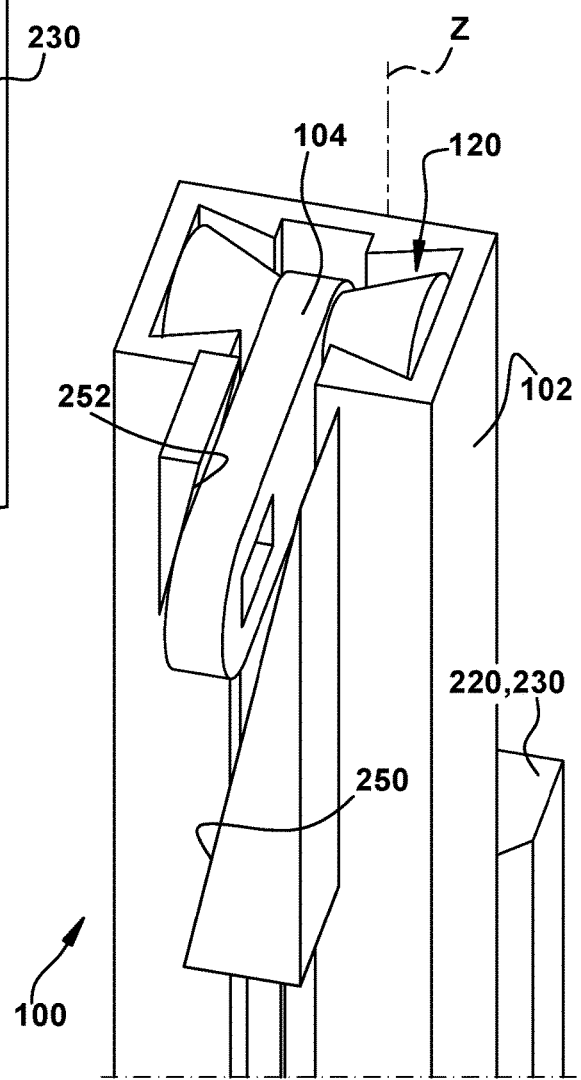

Referring to FIGS. 18-19, the anchor assembly 100 includes one or more mounting structures or "mounts" 220 that connect the track 102 to the vehicle structure, e.g., the B-pillar 36. The mounts 220 are configured to permit the track 102 to pivot relative to the vehicle structure, as indicated generally by the double-headed arrow in FIG. 18. The pivot of the track 102 also causes the anchor 104 to pivot along with it, as shown in FIGS. 17A-B. Because of this, clearance between the roller 160 and the channel 120 is not relied upon to allow pivoting motion of the anchor 104.

In the example configuration of FIGS. 17A-19, the mounts 220 include a base 230 and an arm 240 configured to pivot relative to the base. The track 102 is connected to the arm 240 and pivots with it relative to the base 230. To facilitate the pivoting, the mounts have a cylinder/socket configuration in which the arm 240 has an end 242 that is received in a socket 232 of the base 230. The end 242 has a convex, semi-cylindrical that engages and mates with a concave, semi-cylindrical surface of the socket 232. This semi-cylindrical configuration limits that pivoting movement of the arms 240 and track 102, allowing pivotal movement of the anchor assembly 100 about a mount axis Z.

Advantageously, the pivot of the anchor assembly 100 can allow the pivotal position of the anchor 104, particularly the shank 150 to be adjusted in response to engagement with the vehicle trim pieces 170. This helps ensure that the shank 150, and the tether 106 attached to the shank, can be guided to move along the gap G between the edge 178 of the trim piece 172 and the vehicle structure (e.g., B-pillar 36) so that the curtain airbag 50 can deploy, as illustrated in FIGS. 17A-B.

In the condition of FIG. 17A, the anchor 104 is positioned above the weatherstripping 194 and pivoted outboard OB. This can, for example, facilitate accommodating the anchor in the space available along the roof rail and also facilitate connection of the shank 150 to the curtain airbag 50 with a short tether 106. In this outboard pivoted condition, the gap G between the weatherstripping 194 and the B-pillar trim piece 172 is covered by the track 102.

As shown in FIG. 17B, as the curtain airbag 50 deploys and the anchor 104 is pulled downward, the anchor assembly can pivot so that the shank 150 clears the weatherstripping 194 and moves along the gap G. This is not necessarily to say that the shank 150 does not engage the weatherstripping 194. The shank 1450 could at least partially engage the weatherstripping 194, e.g., at or about its edge, but the contact is kept at a minimum so as to offer the least resistance to airbag deployment. In comparison, if the anchor assembly 100 did not pivot, it would need to displace a larger portion of the weatherstripping 194 and/or the B-pillar trim piece 172.

The forces that urge the pivoting movement of the anchor assembly 100 can be caused by engagement between the shank 150 and trim pieces 170 or other vehicle structure, as described above with reference to FIG. 10B. This is shown schematically in FIGS. 18-19. As shown in these figures, angled surfaces 250, 252 can urge the anchor assembly 100 to pivot relative to the vehicle structure (e.g., B-pillar) to which it is mounted via the mounts 220. The surfaces 250, 252 can be trim piece surfaces (e.g., B-pillar trim piece, pillar cap trim piece, headliner), vehicle structure (e.g., sheet metal surfaces), or surfaces added to the configurations of these structures for the purpose of directing the pivotal motion of the anchor assembly 100, such as a ramp or pin/slot structure. As another alternative, a curtain airbag deployment ramp, which some vehicles include to help the curtain airbag clear the B-pillar and other trim pieces, could be modified to also provide a surface for controlling the pivot of the anchor assembly 100.

In the example configuration of FIGS. 17A-19, the surface 250 is configured to direct the anchor assembly 100 to pivot inboard IB to the position of FIG. 17B to position the shank 150 in the gap G during airbag deployment. The surface 252 is configured to direct and maintain the anchor assembly 100 pivoted outboard OB to the position of FIG. 17A prior to airbag deployment. Of course, the example configuration of FIGS. 17A-19 could be reversed, with the pivotal movement of the anchor assembly 100 being in an outboard OB direction in order to position the shank 150 in the gap G, for example, in a manner similar or identical to that described in reference to FIG. 10B.

What have been described above are example configuration(s). It is, of course, not possible to describe every conceivable combination or arrangement of components and their resulting configurations, but one of ordinary skill in the art will recognize that many further combinations of components and resulting configurations are possible. Accordingly, this description is intended to embrace all such configurations and any alterations, modifications, or variations that fall within the scope of the following claims.

Having described the invention, the following is claimed:

1. An anchor assembly for connecting a curtain airbag to a side structure of a vehicle, the anchor assembly comprising:
   an elongated track configured to be connected to the side structure of the vehicle behind a vehicle trim piece that covers the side structure and forms a surface visible from within a passenger compartment of the vehicle, the track comprising sidewalls defining an interior channel that extends along a length of the track and a slot that extends from the channel through at least one of the sidewalls and along the length of the track; and
   an anchor configured to move along the track along a track axis, the anchor comprising a shank and a roller that is connected to the shank and rotatable relative to the shank about a roller axis, wherein the roller and a portion of the shank to which the roller is connected are positioned in the channel and are movable along the channel when the anchor moves along the track, and a portion of the shank extends through the slot, is positioned on an exterior of the track, is configured to move along the slot when the anchor moves along the track, and is configured to be connected to the curtain airbag;
   wherein the track is configured so that the slot is at least partially exposed to a gap between the vehicle trim piece and the side structure so that the portion of the shank that extends through and moves along the slot can also move along the gap without displacing the vehicle trim piece in response to curtain airbag deployment,
   wherein the roller and the channel are configured so that there is a clearance between the roller and the channel that permits the anchor to pivot relative to the track about the track axis,
   wherein the roller comprises frusto-conical surfaces that are centered on the roller axis and positioned on opposite sides of the shank,
   wherein the sidewalls of the channel comprise wall surfaces that are planar and extend along the length of the track on opposite sides of the slot,
   wherein the frusto-conical surfaces of the roller are configured to flatly engage corresponding ones of the wall surfaces when the anchor pivots relative to the track.

2. The anchor assembly recited in claim 1, wherein the track and anchor are configured to permit the anchor to pivot relative to the track in response to engagement with the vehicle trim piece and/or the vehicle side structure so that the anchor can react to interferences with the vehicle trim piece and/or the vehicle side structure during a collision.

3. The anchor assembly recited in claim 1, wherein the sidewalls are configured to define roller receiving portions of the track on opposite sides of the slot, wherein contours of the roller receiving portions are configured to follow contours of roller portions of the roller positioned on opposite sides of the shank, wherein the roller portions and the roller receiving portions are configured to produce a clearance between the roller portions and the roller receiving portions, the clearance being configured to permit the anchor to pivot relative to the track, wherein the roller receiving portions include the wall surfaces of the channel, and the roller portions include the frusto-conical surfaces of the roller.

4. The anchor assembly recited in claim 3, wherein the roller portions each comprise an outer cylindrical portion having a first diameter and an inner cylindrical portion having a second diameter, less than the first diameter, wherein the frusto-conical surface of each roller portion extend between their respective outer and inner cylindrical portions, and wherein the wall surfaces of the channel are configured to mate or substantially mate with the frusto-conical surfaces.

5. The anchor assembly recited in claim 1, wherein the anchor is configured to pivot a predetermined pivot angle relative to the track, and wherein the frusto-conical surfaces of the roller and the wall surfaces of the channel are configured to differ by an angle equal to the pivot angle.

6. The anchor assembly recited in claim 1, wherein the pivot of the anchor relative to the track is also configured to cause the anchor to engage the track and inhibit upward movement of the anchor along the track.

7. The anchor assembly recited in claim 1, wherein the track and the anchor are configured to be concealed behind the vehicle trim piece when installed in the vehicle, and wherein the anchor assembly is configured so that the portion of the shank configured to be connected to the curtain airbag extends from behind the vehicle trim piece when moving along the track in response to inflation and deployment of the curtain airbag.

8. The anchor assembly recited in claim 7, wherein the track and anchor are configured to permit the anchor to pivot relative to the track in response to engagement with the vehicle trim piece to permit the shank to clear the vehicle trim piece when moving along the track in response to inflation and deployment of the curtain airbag.

9. The anchor assembly recited in claim 7, wherein the vehicle trim piece cooperates with weatherstripping to conceal the anchor assembly prior to curtain airbag deployment, and wherein the shank is configured to be deflected by the vehicle trim piece and to cause the anchor to pivot relative to the track to permit the shank to clear the vehicle trim piece when the anchor moves along the track in response to inflation and deployment of the curtain airbag.

10. The anchor assembly recited in claim 7, further comprising a pivoting structure configured to cover the gap, wherein the pivoting structure covers the track and is configured to pivot and reveal the track in response to the anchor moving along the track.

11. The anchor assembly recited in claim 10, wherein the pivoting structure is configured to extend from the vehicle trim piece to weatherstripping that forms a seal with a vehicle door or window opening.

12. The anchor assembly recited in claim 7, further comprising a deflectable structure configured to cover the gap, wherein the deflectable structure covers the track and is configured to deflect and reveal the track in response to the anchor moving along the track.

13. The anchor assembly recited in claim 12, wherein the deflectable structure includes a portion that forms weatherstripping which forms a seal with a vehicle door or window opening.

14. The anchor assembly recited in claim 7, wherein the anchor is configured to pivot in response to curtain airbag deployment so that the shank clears the vehicle trim piece and moves along the gap in response to deployment of the curtain airbag.

15. The anchor assembly recited in claim 14, wherein the shank is configured to engage the vehicle side structure during curtain airbag deployment, the engagement urging the shank and the anchor to pivot so that the shank clears the vehicle trim piece and moves along the gap in response to deployment of the curtain airbag.

16. A vehicle safety system comprising:
a curtain airbag module comprising a curtain airbag and an inflator for inflating the curtain airbag;
the anchor assembly recited in claim 1; and
a tether for connecting the anchor assembly to the curtain airbag.

17. The vehicle safety system recited in claim 16, wherein the anchor assembly is configured to be connected to a vehicle pillar adjacent a side window opening and the curtain airbag module is configured to be connected to the vehicle along a roof rail extending above the side window opening, wherein the tether is configured to connect a lower edge portion of the curtain airbag to the anchor.

18. The vehicle safety system recited in claim 17, wherein the curtain airbag is configured to inflate and deploy downward to at least partially cover the side window opening, wherein the anchor is configured to move downward along the track and along the pillar in response to being pulled along by the deploying curtain airbag, wherein the anchor is configured to pivot relative to the track in response to an occupant engaging the curtain airbag and urging the curtain airbag outboard toward the side window opening, wherein the frusto-conical surfaces of the roller are configured to engage corresponding ones of the wall surfaces in response to the anchor pivoting and to cause the anchor to resist upward movement along the track.

19. The anchor assembly recited in claim 1, wherein the anchor and the track are configured so that when the anchor pivots relative to the track, a first frusto-conical surface of the roller engages a first wall surface of the channel on a front wall of the track, and a second frusto-conical surface of the roller engages a second wall surface of the channel on a rear wall of the track, opposite the front wall of the track, so that a rolling direction of the first frusto-conical surface of the roller along the first wall surface of the channel is opposite a rolling direction of the second frusto-conical surface of the roller along the second wall surface of the channel.

20. An anchor assembly for connecting a curtain airbag to a side structure of a vehicle, the anchor assembly comprising:
an elongated track configured to be connected to the side structure of the vehicle behind a vehicle trim piece that covers the side structure and forms a surface visible from within a passenger compartment of the vehicle, the track comprising sidewalls defining an interior channel that extends along a length of the track and a slot that extends from the channel through at least one of the sidewalls and along the length of the track; and
an anchor configured to move along the track, the anchor comprising a shank and a roller that is connected to the shank and rotatable relative to the shank, wherein the roller and a portion of the shank to which the roller is connected are positioned in the channel and are movable along the channel when the anchor moves along the track, and a portion of the shank extends through the slot, is positioned on an exterior of the track, is configured to move along the slot when the anchor moves along the track, and is configured to be connected to the curtain airbag;
wherein the track is configured so that the slot is at least partially exposed to a gap between the trim vehicle piece and the side structure so that the portion of the shank that extends through and moves along the slot can also move along the gap without displacing the vehicle trim piece in response to curtain airbag deployment;
wherein the track and the anchor are configured to be concealed behind the vehicle trim piece when installed in the vehicle, and wherein the anchor assembly is configured so that the portion of the shank configured to be connected to the curtain airbag extends from behind the vehicle trim piece when moving along the track in response to inflation and deployment of the curtain airbag; and
wherein the vehicle trim piece is configured to cooperate with weatherstripping to conceal the track, wherein the track is configured to be mounted obliquely outward at an angle so that the shank is directed toward the weatherstripping, and wherein the shank is configured to deflect the weatherstripping and reveal the track in response to the anchor moving along the track.

* * * * *